United States Patent
Kaneda et al.

(10) Patent No.: US 9,188,040 B2
(45) Date of Patent: Nov. 17, 2015

(54) HONEYCOMB STRUCTURE

(71) Applicant: NGK Insulators, Ltd., Nagoya (JP)

(72) Inventors: Atsushi Kaneda, Nagoya (JP);
Yoshimasa Omiya, Nagoya (JP);
Yoshiyuki Kasai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 44 days.

(21) Appl. No.: 14/227,224

(22) Filed: Mar. 27, 2014

(65) Prior Publication Data

US 2014/0212339 A1 Jul. 31, 2014

Related U.S. Application Data

(63) Continuation of application No. PCT/JP2012/075168, filed on Sep. 28, 2012.

(30) Foreign Application Priority Data

Sep. 30, 2011 (JP) ................. 2011-218224

(51) Int. Cl.
*B01D 39/00* (2006.01)
*B01D 41/00* (2006.01)
*B01D 45/00* (2006.01)
(Continued)

(52) U.S. Cl.
CPC ............. *F01N 3/2026* (2013.01); *B01J 35/04* (2013.01); *F01N 3/2828* (2013.01); *B01D 53/94* (2013.01); *F01N 2330/30* (2013.01);
(Continued)

(58) Field of Classification Search
CPC .... F01N 3/0222; F01N 3/027; B01D 46/0063
See application file for complete search history.

(56) References Cited

U.S. PATENT DOCUMENTS 4,810,554 A * 3/1989 Hattori et al. ................. 428/116
5,063,029 A 11/1991 Mizuno et al.
(Continued)

FOREIGN PATENT DOCUMENTS

EP 0 572 827 A1 12/1993
JP 05-115795 A1 5/1993
(Continued)

OTHER PUBLICATIONS

International Search Report and Written Opinion dated Dec. 4, 2012.
(Continued)

*Primary Examiner* — Amber Orlando
(74) *Attorney, Agent, or Firm* — Burr & Brown, PLLC

(57) ABSTRACT

A honeycomb structure includes a center part which has a cylindrical honeycomb structure part with a porous partition wall and an outer circumferential wall defining a plurality of cells, and which has a pair of electrodes disposed on the side surface of the honeycomb structure part. The honeycomb structure also includes an outer circumferential part disposed around the center part. The electric resistivity of the honeycomb structure part is 1-200 Ωcm. Each electrode in the electrode pair is formed in a band shape that extends in the direction that the cells extend. In a cross section, one electrode is located opposite the other electrode over the center of the honeycomb structure part. The outer circumferential part has a porous partition wall and an outer circumferential wall that define a plurality of cells. The volumetric heat capacity of the outer circumferential part is smaller than that of the center part.

16 Claims, 2 Drawing Sheets

(51) Int. Cl.

| | | |
|---|---|---|
| *B01D 46/00* | (2006.01) | |
| *B01D 49/00* | (2006.01) | |
| *B01D 50/00* | (2006.01) | |
| *B01D 51/00* | (2006.01) | |
| *F01N 3/20* | (2006.01) | |
| *B01J 35/04* | (2006.01) | |
| *F01N 3/28* | (2006.01) | |
| *B01D 53/94* | (2006.01) | |

(52) U.S. Cl.
 CPC ........ *F01N 2330/48* (2013.01); *F01N 2330/60* (2013.01); *Y02T 10/26* (2013.01)

(56) References Cited

U.S. PATENT DOCUMENTS

| | | | |
|---|---|---|---|
| 5,288,975 | A | 2/1994 | Kondo |
| RE35,134 | E | 12/1995 | Mizuno et al. |
| 5,733,352 | A * | 3/1998 | Ogawa et al. .................. 55/523 |
| 8,444,752 | B2 * | 5/2013 | Beall et al. ...................... 95/273 |
| 8,506,894 | B2 * | 8/2013 | Ido et al. ........................ 422/174 |
| 8,685,885 | B2 * | 4/2014 | Tamura et al. ................. 502/439 |
| 8,715,579 | B2 * | 5/2014 | Ido et al. ........................ 422/174 |
| 8,907,256 | B2 * | 12/2014 | Hashimoto et al. ........... 219/553 |
| 8,940,242 | B2 * | 1/2015 | Chen et al. ..................... 422/177 |
| 9,023,453 | B2 * | 5/2015 | Ido et al. ........................ 428/116 |
| 2003/0134084 | A1 | 7/2003 | Ichikawa et al. |
| 2004/0118095 | A1 * | 6/2004 | Chikawa et al. ................. 55/523 |
| 2004/0131512 | A1 * | 7/2004 | Abe et al. ....................... 422/180 |
| 2004/0141890 | A1 * | 7/2004 | Hirata et al. ............... 422/186.04 |
| 2006/0228520 | A1 * | 10/2006 | Masukawa et al. ............ 428/116 |
| 2006/0292337 | A1 * | 12/2006 | Ohno et al. .................... 428/116 |
| 2006/0292338 | A1 * | 12/2006 | Ohno et al. .................... 428/116 |
| 2007/0092692 | A1 * | 4/2007 | Masukawa et al. ............ 428/116 |
| 2009/0022943 | A1 * | 1/2009 | Tomita et al. .................. 428/116 |
| 2009/0205315 | A1 | 8/2009 | Kakinohana et al. |
| 2009/0220735 | A1 * | 9/2009 | Mizuno et al. ................. 428/116 |
| 2010/0203284 | A1 * | 8/2010 | Kanai ............................. 428/116 |
| 2011/0250094 | A1 * | 10/2011 | Ido et al. ........................ 422/168 |
| 2012/0076698 | A1 * | 3/2012 | Ishihara ......................... 422/174 |
| 2012/0187109 | A1 | 7/2012 | Noguchi et al. |
| 2012/0248090 | A1 * | 10/2012 | Furukawa et al. ............. 219/538 |

FOREIGN PATENT DOCUMENTS

| | | |
|---|---|---|
| JP | 08-141408 A1 | 6/1996 |
| JP | 2931362 B2 | 8/1999 |
| JP | 2002-172331 A1 | 6/2002 |
| JP | 2006-320818 A1 | 11/2006 |
| JP | 4136319 B2 | 8/2008 |
| JP | 2009-275559 A1 | 11/2009 |
| JP | 2011-174393 A1 | 9/2011 |
| WO | 2011/043434 A1 | 4/2011 |

OTHER PUBLICATIONS

Extended European Search Report (Application No. 12837206.7) dated Jan. 26, 2015.

\* cited by examiner

US 9,188,040 B2

HONEYCOMB STRUCTURE

TECHNICAL FIELD

The present invention relates to a honeycomb structure. More specifically, the present invention relates to a honeycomb structure that serves as a catalyst carrier and also serves as a heater upon application of a voltage. The honeycomb structure has an improved thermal shock resistance.

BACKGROUND ART

Conventionally, a cordierite honeycomb structure with a catalyst loaded therein is used for treating toxic substances contained in an exhaust gas emitted from an automobile engine. Use of a honeycomb structure formed from a silicon carbide sintered body for purification of the exhaust gas is also known (see, for example, Patent Document 1).

When exhaust gas is treated by the catalyst loaded in the honeycomb structure, the catalyst needs to be heated to a predetermined temperature. At the starting up of the engine, however, the catalyst temperature is low, and therefore there is a problem that the exhaust gas is not sufficiently purified.

To deal with this, a metallic heater is provided upstream of the honeycomb structure with the catalyst loaded therein, in order to elevate the exhaust gas temperature (see, for example, Patent Document 2).

There is also disclosed use of another honeycomb structure, which is provided with electrodes at both ends thereof and is made from conductive ceramics as a heater-attached catalyst carrier (see, for example, Patent Document 3). Still another ceramic honeycomb structure that has electrodes on its side face and generates heat upon application of electricity is disclosed (see, for example, Patent Document 4).

CITATION LIST

Patent Document

Patent Document 1: JP Patent No. 4136319
Patent Document 2: JP Patent No. 2931362
Patent Document 3: JP Patent Application Publication No. 8-141408
Patent Document 4: WO 2011/043434

SUMMARY OF THE INVENTION

Problems to be Solved by the Invention

The above-mentioned "ceramic honeycomb structure (catalyst carrier) that has electrodes on its side face and generates heat upon application of electricity (see, for example, Patent Document 4)" is preferably employed in a hybrid car that uses both a gasoline engine and a motor. However, the temperature of the exhaust gas from the gasoline engine is high so that cracking tends to occur at the side face near the ends of the honeycomb structure. Such honeycomb structure demonstrates an excellent effect of being able to cause the current to evenly flow in the honeycomb structure because the honeycomb structure "has the electrodes on the lateral face". On the other hand, such honeycomb structure has a large heat capacity at its side face so that the thermal shock resistance at the side face of the honeycomb structure tends to decrease relatively.

When cracking occurs in the "ceramic honeycomb structure that generates heat upon application of electricity," no current flows in that portion at which the cracking occurs. Thus, it becomes difficult to cause the honeycomb structure to uniformly generate the heat.

The present invention was developed in view of the above-described problems. An object of the present invention is to provide a honeycomb structure which serves as a catalyst carrier, also serves as a heater upon application of a voltage, and has an excellent thermal shock resistance.

Solution for Overcoming the Problems

In order to overcome the above-described problems, the present invent ion provides a honeycomb structure as described below:

[1] A honeycomb structure including a center part including a cylindrical honeycomb structure part and a pair of electrodes provided on a side face of the honeycomb structure part, the honeycomb structure part having a porous partition wall and an outer circumferential wall around the porous partition wall, the porous partition wall defining a plurality of cells extending from one end face to the other end face, the plurality of cells defining fluid passages; and an outer circumferential part provided around the center part, wherein an electric resistivity of the honeycomb structure part is 1-200 $\Omega$cm, each electrode in the pair of electrodes is formed in a band shape that extends in an extending direction of the cells of the honeycomb structure part, one electrode in the pair of electrodes is located opposite the other electrode in the pair of electrodes over a center of the honeycomb structure part, when viewed in a cross section taken in a direction perpendicular to the extending direction of the cells, the outer circumferential part has a porous partition wall and an outer circumferential wall at an outermost circumferential position, the porous partition wall defining a plurality of cells extending from one end face to the other end face, the plurality of cells defining fluid passages, and a volumetric heat capacity (material heat capacity×(1−cell opening percentage/100)) of the outer circumferential part is smaller than a volumetric heat capacity (material heat capacity×(1−cell opening percentage/100)) of the center part.

[2] The honeycomb structure according to [1], wherein the volumetric heat capacity of the outer circumferential part (material heat capacity×(1−cell opening percentage/100)) is 40-900 of the volumetric heat capacity of the center part (material heat capacity×(1−cell opening percentage/100)).

[3] The honeycomb structure according to [1] or [2], wherein an area of the outer circumferential part is 20-50% of an entire area, when viewed in a cross section perpendicular to the extending direction of the cells.

[4] The honeycomb structure according to any one of [1] to [3], wherein a thermal expansion coefficient of the outer circumferential part is $0.1\times10^{-6}$/K to $3.0\times10^{-6}$/K, and a thermal expansion coefficient of the center part is $3.5\times10^{-6}$/K to $5.5\times10^{-6}$/K.

[5] The honeycomb structure according to any one of [1] to [4], wherein an opening percentage of the cells of the outer circumferential part is greater than an opening percentage of the cells of the center part.

Advantageous Effects of Invention

In the honeycomb structure of the present invention, the electric resistivity of the honeycomb structure part in the center part is 1-200 $\Omega$cm (ohm·cm). As such, even if a current is caused to flow using a high voltage power source, the current does not flow excessively, and therefore the honeycomb structure can be preferably used as a heater. The honeycomb structure of the present invention has a pair of electrodes such that each electrode has a band shape extending in the extending direction of the cells of the honeycomb structure part. In the honeycomb structure of the present invention, one electrode in the electrode pair is situated opposite the other electrode in the electrode pair over the center of the honeycomb structure part, when viewed in a cross section perpendicular to the extending direction of the cells. Thus, the honeycomb structure of the present invention can suppress the deviation of the temperature distribution upon application of voltage. Because the outer circumferential part of the honeycomb structure is provided on the outer periphery (side face) of the center part, a high temperature exhaust gas flows in the outer circumferential part and maintains the temperature of the outer periphery of the center part. Consequently, it is possible to prevent the cracking from occurring in the outer circumferential wall of the center part and the like of the honeycomb structure.

MODE FOR CARRYING OUT THE INVENTION

Embodiments of the present invention will now be described in detail with reference to the drawings. It should be appreciated that the present invention is not limited to the below-described embodiments, and various changes and modifications may be made to the below-described embodiments by those skilled in the art without departing from the spirit and scope of the invention.

(1) Honeycomb Structure

Figure 1:
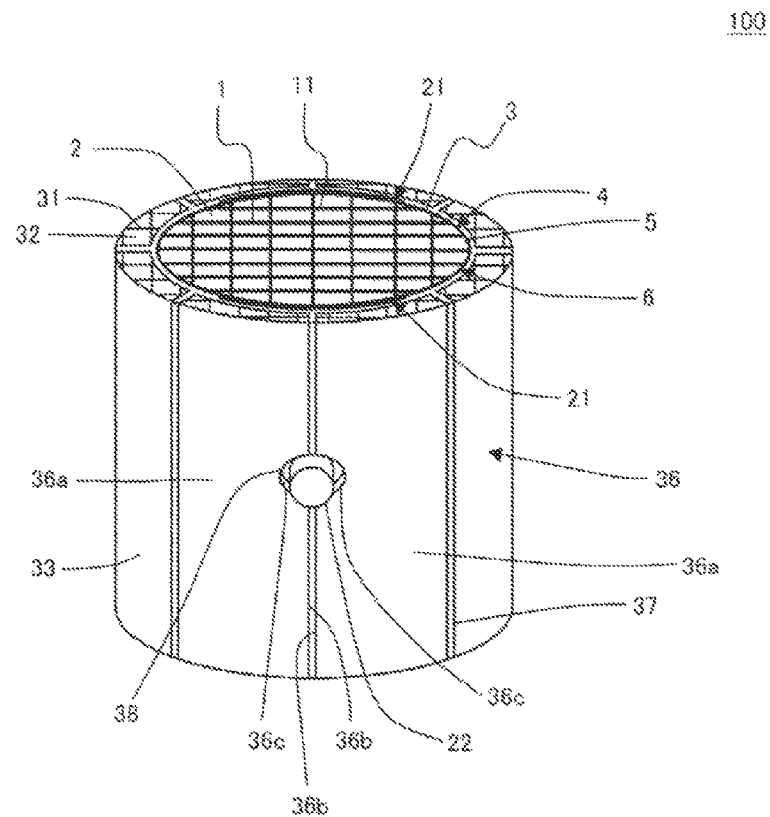
FIG. 1 schematically shows a perspective view of the honeycomb structure according one embodiment of the present invention.
Figure 2:
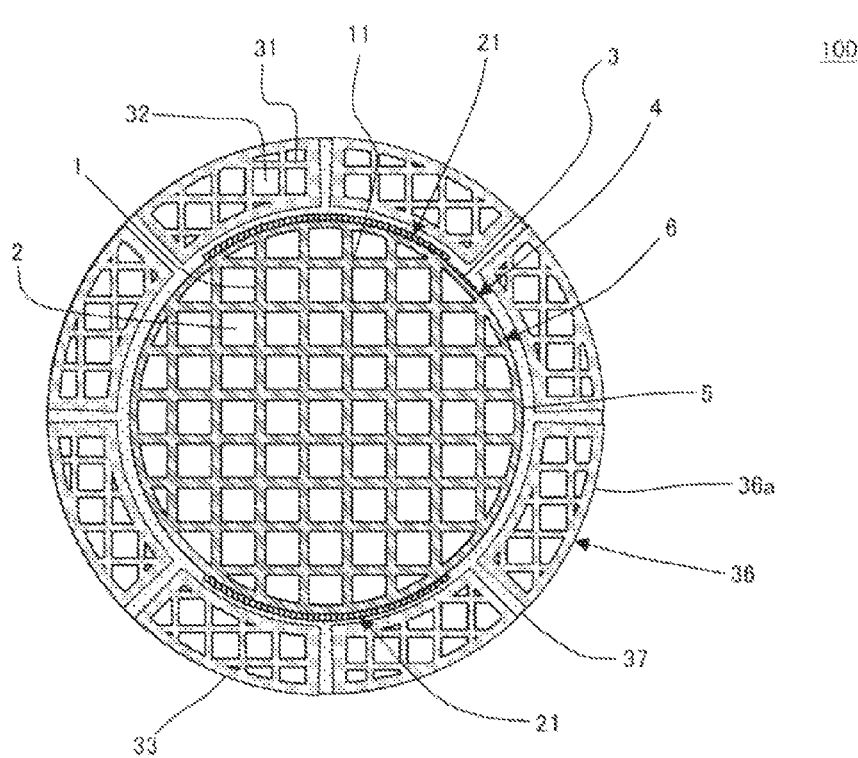
FIG. 2 is a schematic cross-sectional view of the honeycomb structure according to the one embodiment of the present invention, taken in a direction perpendicular to an extending direction of cells.
Figure 3:
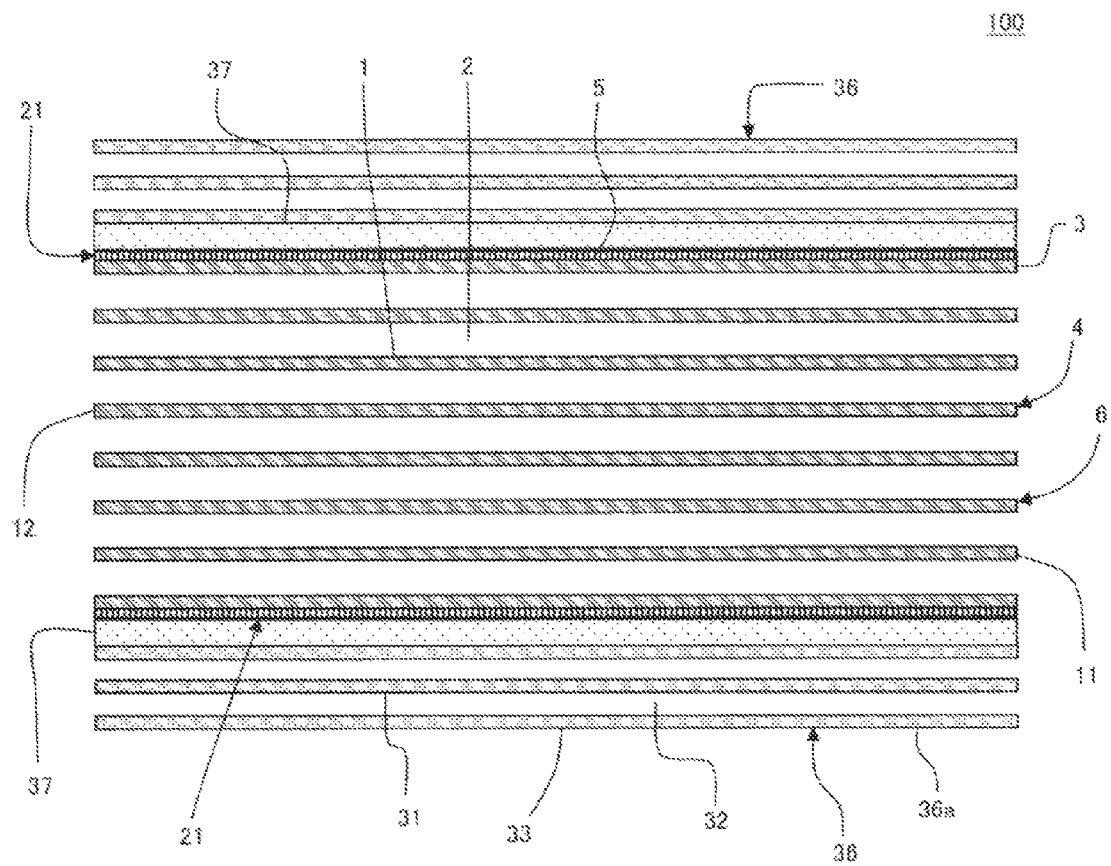
FIG. 3 is a schematic cross-sectional view of the honeycomb structure according to the one embodiment of the present invention, taken in a direction parallel to the extending direction of the cells.

As shown in FIGS. 1-3, a honeycomb structure according to one embodiment of the present invention includes a center part 6 and an outer circumferential part 36 provided around the center part 6. The center part 6 has a cylindrical honeycomb structure part 4, and a pair of electrodes 21, 21 provided on a side face 5 of the honeycomb structure part 4. The cylindrical honeycomb structure part 4 has a porous partition wall 1 that defines a plurality of cells 2 extending from one end face 11 to the other end face 12, and an outer circumferential wall 3 provided around the partition wall. The cells 2 serve as fluid passages. The honeycomb structure part 4 of the honeycomb structure 100 according to this embodiment has an electric resistivity of 1-200 Ωcm. A pair of electrodes 21, 21 of the honeycomb structure 100 of this embodiment have a band shape extending in the extending direction of the cells 2 of the honeycomb structure part 4. One electrode 21 in the electrode pair of the honeycomb structure 100 of this embodiment is located on an opposite side of the other electrode 21 in the electrode pair with respect to the center of the honeycomb structure part 4, when viewed in the cross-sectional view. This "cross section" is a cross section taken in a direction perpendicular to the extending direction of the cells 2 of the honeycomb structure 100 of this embodiment. In the following description, the cross section taken in the direction perpendicular to the cell's extending direction of the honeycomb structure of this embodiment may simply be referred to as "cross section." The outer circumferential part 36 has a porous partition wall (partition wall of the outer circumferential part) 31 that defines a plurality of cells (cells of the outer circumferential part) 32 extending from one end face to the other end face. The cells serve as the passages for the fluid. The outer circumferential part 36 also has an outer peripheral wall (outer circumferential wall of the outer circumferential part) 33 situated at the outermost periphery. In the honeycomb structure 100 of this embodiment, the volumetric heat capacity of the outer circumferential part (i.e., material heat capacity×(1−cell opening percentage/100)) is smaller than the volumetric heat capacity of the center part (material heat capacity×(1−cell opening percentage/100)). FIG. 1 shows a schematic perspective view of a honeycomb structure according to one embodiment of the present invention. FIG. 2 illustrates a schematic cross-sectional view of the honeycomb structure according to the embodiment of the present invention, taken in a direction perpendicular to the extending direction of the cells. FIG. 3 illustrates a schematic cross-sectional view of the honeycomb structure according to the embodiment of the present invention, taken in a direction parallel to the extending direction of the cells.

It should be noted that the extending direction of the cells 2 of the center part 6 (honeycomb structure part 4) is the same as the extending direction of the cells 32 of the outer circumferential part. Both of these cells are open at both of the end faces of the honeycomb structure 100. Neither the cells 2 of the center part 6 (honeycomb structure part 4) nor the cells 32 of the outer circumferential part are preferably plugged by plugging portions. The "volumetric heat capacity $(J/m^3 \cdot K)$" is a heat capacity of the honeycomb structure (the outer circumferential part and the center part). That is, the "volumetric heat capacity $(J/m^3 \cdot K)$" does not represent the heat capacity of the partition wall only, but it represents the heat capacity of the entire honeycomb structure including the partition wall and cells. Specifically, it is a value calculated by the equation "heat capacity of the material×(1−cell opening percentage/100)." The "1−cell opening percentage/100" becomes "volume fraction of the material/100." The cell opening percentage is a percentage (%) of the volume of the cells relative to the volume of the entire honeycomb structure part 4. The volume fraction of the material is a percentage (%) of the volume of the partition wall relative to the volume of the entire honeycomb structure part 4.

As described above, the honeycomb structure part 4 in the center part 6 of the honeycomb structure of this embodiment has an electric resistivity of 1-200 Ωcm so that an excessive current does not flow even if a current is caused to flow using a high voltage power source. Accordingly, the honeycomb structure can preferably be used as a heater. It is also possible to heat the catalyst, which is designed for exhaust gas purification, to a high temperature that is sufficient to demonstrate the catalytic effect in a short period of time. In the honeycomb structure of this embodiment, each of the pair of electrodes 21, 21 extends in a band shape which extends in the extending direction of the cells 2 of the honeycomb structure part 4, respectively. In the honeycomb structure of this embodiment, one electrode 21 of the electrode pair is situated opposite the other electrode 21 of the electrode pair over the center of the honeycomb structure part 4, when viewed in the cross section. Thus, it is possible to suppress the deviation of the temperature distribution when a voltage is applied. Because an "outer circumferential part 36 having a honeycomb structure" is provided on the outer periphery (side face 5) of the center part 6, a high temperature exhaust gas flows in the cells 32 of the outer circumferential part 36, and the temperature of the center part 6 (in particular, the outer peripheral areas of the center part 6) is maintained by the outer circumferential part 36. As a result, it is possible to prevent the cracking from occurring in the outer circumferential wall 3 of the center part 6 and the like. Because the volumetric heat capacity of the outer circumferential part is smaller than the volumetric heat capacity of the center part, the temperature of the outer circumferential part 36 is easily elevated when it is heated by the exhaust gas. As such, the temperature of the center part 6 (particularly, the outer periphery of the center part 6 and its vicinity) is effectively maintained, and therefore the occurrence of the cracking is prevented in the center part 6.

Because the center part of the honeycomb structure of this embodiment is supplied with electricity for heat generation, the occurrence of the cracking is a more serious problem, when compared with an ordinary "honeycomb structure for treating an exhaust gas, with no electricity supplied." The reason is as follows: In case a cracking occurs in the center part of the honeycomb structure of this embodiment, no current would flow in that portion, and therefore a certain portion of the center part would not generate heat. Accordingly, if the honeycomb structure of this embodiment was used as the catalyst carrier and the cracking occurred, then the problem that the temperature rise would be insufficient and the catalyst activity would decrease would occur. In case of the ordinary "honeycomb structure (catalyst body) for treating an exhaust gas, with no electricity supplied," such problem associated with electricity-supply and heat generation would not occur.

Figure 4:
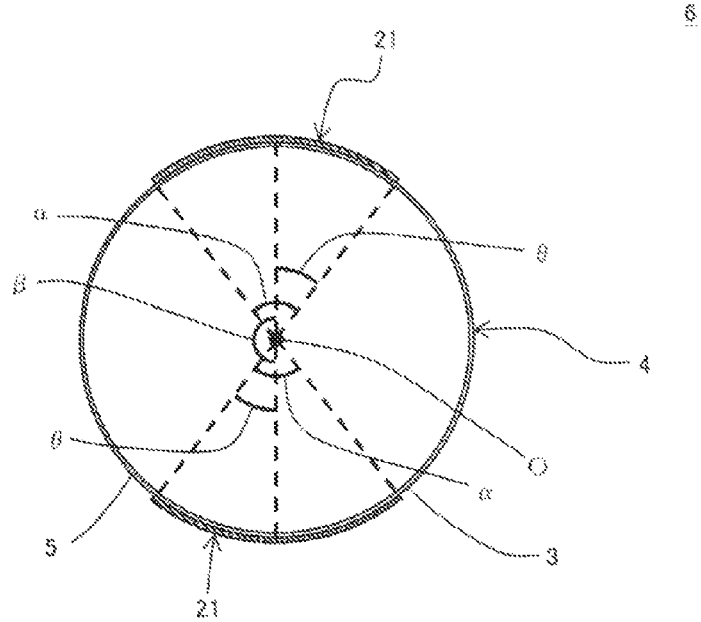
FIG. 4 is a schematic cross-sectional view of a center part constituting the honeycomb structure according to the one embodiment of the present invention, taken in the direction perpendicular to the extending direction of the cells.

The meaning of "one electrode 21 of the electrode pair 21, 21 is situated opposite the other electrode 21 of the electrode pair 21, 21 over the center O of the honeycomb structure part 4, when viewed in the cross section" is as follows (see FIG. 4): In the cross section, an angle defined by a "line connecting the center point of one electrode 21 to the center O of the honeycomb structure part 4", and a "line connecting the center point of the other electrode 21 to the center O of the honeycomb structure part 4" is referred to as beta (see FIG. 4). The above-mentioned meaning is that the two electrodes 21, 21 in the electrode pair are provided in the honeycomb structure part 4 such that the angle beta is in the range of 170-190 degrees (see FIG. 4). The "center point of one electrode 21" is a center point in the "circumferential direction of the honeycomb structure part 4". The "center point of the other electrode 21" is a center point in the "circumferential direction of the honeycomb structure part 4". The angle beta is an angle measured, with the "center O" being the center. FIG. 4 schematically shows a cross-sectional view of the "center part" of the honeycomb structure according to one embodiment of the present invention, taken in a direction perpendicular to the extending direction of the cells. It should be noted that the partition wall is omitted in FIG. 4.

In general use, an ordinary honeycomb structure for exhaust gas treatment, around which a heat insulation material or the like is wound, is inserted in a cylindrical can member attached to an exhaust gas pipe. The center portion of the honeycomb structure is heated to a high temperature by the high temperature exhaust gas, but the outer circumference and its vicinity of the honeycomb structure are cooled from outside because they contact the can or other member (s). Thus, the outer circumference and its vicinity of the honeycomb structure have a lower temperature than the center portion. Also, a fact that the flow rate of the exhaust gas flowing in the cells of the outer circumferential portion of the honeycomb structure is smaller than the flow rate of the exhaust gas flowing in the cells of the center portion of the honeycomb structure is one factor for lowering the temperature near the outer circumference of the honeycomb structure. Because the temperature distribution has a "lower temperature near the outer circumference than the center portion", there is a problem that the cracking occurs near the outer circumference of the honeycomb structure. In particular, when the exhaust gas of a gasoline engine is purified, the exhaust gas of the gasoline engine has a high temperature, and a temperature difference between the vicinity of the outer circumference and the center portion tends to become large. This causes a problem that the cracking is easier to occur. In the honeycomb structure 100 of this embodiment, on the other hand, the exhaust gas flows both in the center part 6 and in the outer circumferential part 36 when the exhaust gas is treated. Because the "outer circumferential part 36, which is heated to a high temperature due to the exhaust gas flow", is provided on the outer circumference of the center part 6, the vicinity of the outer circumference of the center part 6 is maintained at a high temperature. Thus, it is possible to prevent the cracking from occurring in the vicinity of the outer circumference of the center part 6.

In the honeycomb structure 100 of this embodiment, the volumetric heat capacity of the outer circumferential part 36 is preferably 40-90% of the volumetric heat capacity of the center part 6. More preferably the volumetric heat capacity of the outer circumferential part 36 is 40-80% of the volumetric heat capacity of the center part 6, and particularly preferably the volumetric heat capacity of the outer circumferential part 36 is 40-70% of the volumetric heat capacity of the center part 6. With the volumetric heat capacity of the outer circumferential part 36 being in the above-mentioned range, the temperature of the outer circumferential part 36 is easy to rise. As a result, the temperature decrease in the vicinity of the outer periphery of the center part 6 is effectively prevented. If the volumetric heat capacity of the outer circumferential part 36 is greater than 90% of the volumetric heat capacity of the center part 6, the cracking may tend to occur in the vicinity of the outer circumferential wall of the center part 6.

When viewed in a cross section taken in the direction perpendicular to the extending direction of the cells (cells 2 and 32) of the honeycomb structure 100 of this embodiment, the area of the outer circumferential part 36 is preferably 20-50% of the entire area of that cross section. More preferably the area of the outer circumferential part 36 is 20-40% of the entire area of that cross section, and particularly preferably the area of the outer circumferential part 36 is 20-35% of the entire area of that cross section. With the area of the outer circumferential part 36 being in the above-mentioned range, the temperature of the center part 6 is effectively maintained, and it is possible to prevent the size of the honeycomb structure 100 from becoming too large. If the area of the outer circumferential part 36 is smaller than 20% of the entire area, the capability of maintaining the temperature (thermal insulation) of the center part 6 tends to decrease. If the area of the outer circumferential part 36 is larger than 50% of the entire area, the overall size of the honeycomb structure 100 may become too large. Because the honeycomb structure 100 of this embodiment is primarily designed to carry the catalyst in the center part 6, which generates heat upon electricity feeding, so as to purify the exhaust gas, the center part 6 needs to have a certain size sufficient to effectively purify the exhaust gas. As such, if there is provided an outer circumferential part 36 whose size (in terms of area) is greater than 50% of the center part 6, the overall size of the honeycomb structure 100 may become too large. It should be noted that although the outer circumferential part 36 does not generate heat upon electricity feeding, it is preferred that the outer circumferential part 36 may carry the catalyst to enable treatment of the exhaust gas.

In the honeycomb structure 100 of this embodiment, the opening percentage of the cells 32 of the outer circumferential part 36 is preferably greater than the opening percentage of the cells 2 of the center part 6. More preferably the opening percentage of the cells 32 of the outer circumferential part 36 is 1-10% greater than the opening percentage of the cells 2 of the center part 6, and particularly preferably the opening percentage of the cells 32 of the outer circumferential part 36 is 1-5% greater than the opening percentage of the cells 2 of the center part 6. When the exhaust gas flows in the honeycomb structure 100, the exhaust gas tends to flow in the center part and is rather difficult to flow in the outer circumferential part. For this reason, the opening percentage of the outer circumferential part is set to be large and a larger amount of exhaust gas is allowed to flow in the outer circumferential part, whereby the temperature of the center part is effectively maintained.

The sentence "the opening percentage of the cells 32 of the outer circumferential part 36 is 1% greater than the opening percentage of the cells 2 of the center part 6" means that when the opening percentage of the center part 6 is 78%, for example, the opening percentage of the outer circumferential part 36 is 79% (i.e., 1% greater than 78%). As shown in FIG. 1, when the outer circumferential part 36 is configured from a plurality of honeycomb segments 36a coupled to each other, the area of the entire end face of the outer circumferential part 36 is a sum of the area of the partition wall 31, cells 32, outer circumferential wall 33 and bonding parts bonding part 37. The bonding parts 37 are used to bond the honeycomb segments 36a to each other.

Now, the respective components of the honeycomb structure 100 of this embodiment will be described.

(1-1) Center Part

As shown in FIGS. 1-3, the material of the partition wall 1 and outer circumferential wall 3 of the center part 6 in the honeycomb structure 100 of this embodiment preferably contains, as their main component, a silicon-silicon carbide composite material or silicon carbide, and more preferably the material of the partition wall 1 and outer circumferential wall 3 of the center part 6 of the honeycomb structure 100 is silicon-silicon carbide composite material or silicon carbide. The sentence "material of the partition wall 1 and outer circumferential wall 3 contains, as their main component, a silicon carbide particle and silicon" means that the partition wall 1 and outer circumferential wall 3 contain the silicon carbide particle and silicon by 90 mass % of the entire mass or more. By using such material, the electric resistivity of the honeycomb structure part can be 1-200 Ωcm. The silicon-silicon carbide composite material contains the silicon carbide particle, which is an aggregate, and also contains silicon, which is a binder to bind the silicon carbide particle. The silicon-silicon carbide composite material is preferably made from a plurality of silicon carbide particle bound by silicon with pores being formed among the silicon carbide particle. The material of the partition wall 1 and outer circumferential wall 3 being silicon carbide means that the silicon carbide is made from a sintered silicon carbide (particle). The electric resistivity of the honeycomb structure part is a value at 400 degrees C.

As shown in FIGS. 1 to 3, a pair of electrodes 21, 21 are provided on the side face 5 of the honeycomb structure part 4 in the center part 6 of the honeycomb structure 100 according to this embodiment. The honeycomb structure 100 of this embodiment generates heat upon application of a voltage across this pair of electrodes 21, 21. The voltage to be applied is preferably 12-900 V, and more preferably 64-600 V.

As shown in FIGS. 1 to 4, each electrode of the electrode pair 21, 21 is shaped like a band that extends in the same direction as the cells 2 of the honeycomb structure part 4 extend. In the cross section taken in the direction perpendicular to the extending direction of the cells 2, one electrode 21 in the electrode pair is situated opposite the other electrode 21 in the electrode pair over the center O of the honeycomb structure part 4 therebetween. In this manner, each electrode 21 is formed in a band shape in the honeycomb structure of this embodiment, and the longitudinal direction of the band-shaped electrode 21 extends in the same direction as the cells 2 of the honeycomb structure part 4 extend. In the honeycomb structure of this embodiment, the paired two electrodes 21, 21 are located opposite with respect to the center O of the honeycomb structure part 4. Thus, it is possible to suppress the deviation of the current that flows in the honeycomb structure part 4 when the voltage is applied across the electrode pair 21, 21, and this in turn reduces the deviation of heat generation in the honeycomb structure part 4.

In the honeycomb structure 100 of this embodiment, a half of the central angle alpha ($\alpha$) of the electrode pair 21, 21 of the center part 6 in the cross section taken in the direction perpendicular to the extending direction of the cells 2 (i.e., theta ($\theta$) which is 0.5 times the central angle alpha ($\alpha$)) is preferably 15-65 degrees (see FIG. 4). When the angle theta, i.e., the half of the central angle alpha of each of the electrodes 21, 21, is 15-65 degrees, in the cross section, then it is possible to suppress the deviation of the current flowing in the honeycomb structure part 4 of the center part 6 upon application of the voltage across the pair of electrodes 21, 21. Accordingly, it is possible to suppress the deviation of heat generation inside the honeycomb structure part 4 of the center part 6.

In the cross section taken in the direction perpendicular to the extending direction of the cells 2, the upper limit value of the "angle theta which is half of the central angle alpha" of each of the electrodes 21, 21 provided in the center part 6, is more preferably 60 degrees, and particularly preferably 55 degrees. In the cross section taken in the direction perpendicular to the extending direction of the cells 2, the lower limit value of the "angle theta which is half of the central angle alpha" of the electrodes 21, 21, is more preferably 20 degrees, and particularly preferably 30 degrees. The "angle theta which is half of the central angle alpha" of one electrode 21 is preferably 0.8-1.2 times the "angle theta which is half of the central angle alpha" of the other electrode 21, and more preferably 1.0 time (is the same as) the "angle theta which is half of the central angle alpha" of the other electrode 21. With such configuration, it is possible to suppress the deviation of the current flowing in the honeycomb structure part 4 of the center part 6 when the voltage is applied across the electrode pair 21, 21. Thus, it is possible to suppress the deviation of the heat generation in the honeycomb structure part 4 of the center part 6.

In the honeycomb structure 100 of this embodiment, the electrodes 21, 21 are preferably elongated in the circumferential direction of the honeycomb structure part 4 in order to cause the current to uniformly flow in the honeycomb structure part as described above. In order to cause the current to uniformly flow in the honeycomb structure part, it is preferred that the electrodes 21, 21 span the both ends of the honeycomb structure part 4 in the extending direction of the cells or extend with a slight gap being left between the electrodes and the ends of the honeycomb structure part 4. In this manner, the electrodes 21, 21 preferably expand in a wide area on the side face of the honeycomb part 4. It should be noted, however, that if the electrodes 21, 21 are provided in a large area on the side face of the honeycomb structure part 4, such portion of the honeycomb structure part have a large volumetric heat capacity and therefore cracking may tend to occur in the center part. In the honeycomb structure 100 of this embodiment, however, the outer circumferential part restricts the temperature deviation inside the center part (restricts the widening of the difference between the temperature of the center portion and the temperature of the vicinity of the outer periphery inside the center part). Accordingly, even if the electrodes 21, 21 are installed to extend in a large area on the side face of the honeycomb structure part 4 as described above, it is still possible to prevent the occurrence of the cracking in the center part.

The thickness of the electrode 21 is preferably 0.01-5 mm, and more preferably 0.01-3 mm. With such thickness range, it is possible to generate heat uniformly. If the thickness of the electrode 21 is smaller than 0.01 mm, the electric resistance becomes large and this may hinder the uniform heat generation. If the thickness of the electrode 21 is greater than 5 mm, the breakage may easily occur upon canning.

Preferably the electrodes 21 have the silicon carbide particle and silicon as their main components. More preferably the electrodes 21 are formed from the silicon carbide particle and silicon, as their raw material, except for normally contained impurities. Use of the "silicon carbide particle and silicon as their main components", means that a total mass of the silicon carbide particle and silicon is equal to or greater than 90 mass % of the entire electrodes. Because the main components of the electrodes 21 are the silicon carbide particle and silicon, the components of the electrodes 21 are the same as or similar to the components of the honeycomb structure part 4. Thus, the thermal expansion coefficient of the electrodes 21 becomes the same as or is similar to the thermal expansion coefficient of the honeycomb structure part 4. When the components of the electrodes 21 are "similar" to the components of the honeycomb structure part 4, the material of the honeycomb structure part is silicon carbide. Because the electrodes 21 and the honeycomb structure part 4 have the same or similar material, the bonding strength between the electrodes 21 and the honeycomb structure part 4 becomes also high. As a result, even if a thermal stress is applied on the honeycomb structure, it is possible to prevent the electrodes 21 from peeling off from the honeycomb structure part 4, and prevent the breakage of the bonding part between the electrodes 21 and the honeycomb structure part 4.

In the center part 6 of the honeycomb structure 100 of this embodiment, each electrode 21 has a rectangular plate member bent along the outer circumference of the cylindrical shape. Hereinafter, the shape which is obtained by deforming the bent electrode to non-bent planar member is referred to as "planar shape" of the electrode. Then, the "planar shape" of each electrode provided at the center part of the honeycomb structure of this embodiment is rectangular. It should be noted that the shape of the electrode is not limited to a rectangle. The shape of the electrode may be rectangular with the corners being rounded, for example, outwardly convex arc shape, rectangular with the corners being chamfered linearly, or any other shape.

The electric resistivity of the electrode 21 is preferably 0.1-100 Ωcm, and more preferably 0.1-50 Ωcm. With the electric resistivity of the electrode 21 being in such range, the pair of electrodes 21, 21 effectively function as the electrodes in the pipes through which the high temperature exhaust gas flows. If the electric resistivity of the electrode 21 is smaller than 0.1 Ωcm, the temperature in those portions of the honeycomb part which are near both ends of the electrodes 21, viewed in the cross section perpendicular to the extending direction of the cells, may be easily elevated. If the electric resistivity of the electrode 21 is greater than 100 Ωcm, the current does not flow easily, and therefore the electrodes 21 may be difficult to demonstrate their function as the electrodes. The electric resistivity of the electrode is a value at 400 degrees C.

The porosity of the electrode 21 is preferably 30-60%, and more preferably 30-550. With the porosity of the electrode 21 being in such range, it is possible to obtain a preferred electric resistivity. If the porosity of the electrode 21 is lower than 30%, the electrode may be deformed during the manufacturing. If the porosity of the electrode 21 is larger than 60%, the electric resistivity of the electrode may become too high. The porosity is a value measured by a mercury porosimeter.

The average pore diameter of each electrode 21 is preferably 5-45 micrometers (μm), and more preferably 7-40 micrometers. With the average pore diameter of the electrode 21 being in such range, a preferred electric resistivity is obtained. If the average pore diameter of the electrode 21 is smaller than 5 micrometers, the electric resistivity may become too high. If the average pore diameter of the electrode 21 is greater than 45 micrometers, the strength of the electrode 21 may become low, and therefore the electrode may easily break. The average pore diameter is a value measured by a mercury porosimeter.

When the main components of the electrode 21 are the silicon carbide particle and silicon, it is preferred that the silicon carbide particle contained in the electrode 21 has an average particle diameter of 10-60 micrometers, and more preferably 20-60 micrometers. By having the average particle diameter of the silicon carbide particle contained in the electrode 21 in the above-mentioned range, it is possible to regulate the electric resistivity of the electrode 21 in a range of 1-100 Ωcm. If the average pore diameter of the silicon carbide particle contained in the electrode 21 is smaller than 10 micrometers, the electric resistivity of the electrode 21 may become too large. If the average pore diameter of the silicon carbide particle contained in the electrode 21 is greater than 60 micrometers, the strength of the electrode 21 may decrease and the electrode 21 may become easy to break. The average particle diameter of the silicon carbide particle contained in the electrode 21 is a value obtained by observing the cross section and surface of the electrode 21 with an SEM and measuring by means of image processing software. As image processing software, for example, ImageJ (manufactured by NIH (National Institute of Health) Co., Ltd.) may be used. Specifically, for example, firstly, a sample that is used for observation of the cross section and surface is cut off from the electrode 21. The concave and convex on the cross section of the electrode 21 are filled with resin. Then the cross section undergoes the polishing, and the polished face is observed. For the surface of the electrode 21, on the other hand, the sample (partition wall) is observed as it is cut off. The arithmetic mean of the observation results in the five fields of view of the cross section and the observation results in the five fields of view of the surface is taken as the average particle diameter of the silicon carbide particle contained in the electrode 21. It should be noted that the "average particle diameter of the silicon carbide particle of the honeycomb structure part 4 of the center part 6" (will be described later), and the "average particle diameter of the silicon carbide particle contained in the electrode terminal 22" (will be described later) are values measured in the similar manner to the "measuring method for the average particle diameter of the silicon carbide particle contained in the electrode 21".

The percentage of the mass of silicon contained in the electrode 21 relative to the "total mass of the silicon carbide particle and silicon" contained in the electrode 21 is preferably 20-40 mass %, and more preferably 25-35 mass %. By having the percentage of the mass of the silicon relative to the total mass of the silicon carbide particle and silicon contained in the electrode 21 in the above-mentioned range, it is possible for the electrode 21 to have the electric resistivity in a range of 0.1-100 Ωcm. If the percentage of the mass of the silicon relative to the total mass of the silicon carbide particle and silicon contained in the electrode 21 is smaller than 20 mass %, then the electric resistivity may become too large. If the percentage is greater than 40 mass %, then the electrode may easily be deformed during the manufacturing.

The thickness of the partition wall in the center part 6 of the honeycomb structure 100 of this embodiment is 50-200 micrometers, and preferably 70-130 micrometers. By having the partition wall thickness in the above-mentioned range, it is possible to prevent the pressure loss of the exhaust gas from becoming excessively large even when the honeycomb structure 100 is used as the catalyst carrier to support the catalyst when the exhaust gas is allowed to flow. When the honeycomb structure is used for treating the exhaust gas, in particular when the honeycomb structure treats the exhaust gas of a gasoline engine, the cracking easily occurs as the partition wall thickness decreases. In this connection, the honeycomb structure of this embodiment can particularly demonstrate the effect of "preventing the occurrence of the cracking in the center part" in a remarkable manner when the partition wall of the center part is thin. In other words, even when the honeycomb structure of this embodiment has a "thin partition wall" configuration, which is easy to have the cracking, it is still possible to effectively prevent the occurrence of the cracking. If the partition wall thickness is smaller than 50 micrometers, the strength of the honeycomb structure may decrease. If the partition wall thickness is greater than 200 micrometers, the exhaust gas pressure loss may become large when the honeycomb structure 100 is used as the catalyst carrier to support the catalyst when the exhaust gas is allowed to flow.

In the center part 6 of the honeycomb structure 100 of this embodiment, the cell density in the honeycomb structure part 4 is preferably 40-150 cells/cm$^2$, and more preferably 70-100 cells/cm$^2$. By having the cell density in the above-mentioned range, it is possible to enhance the purifying capability of the catalyst while the pressure loss when the exhaust gas is allowed to flow is made low. If the cell density is lower than 40 cells/cm$^2$, the area for loading the catalyst may become small. If the cell density is higher than 150 cells/cm$^2$, the pressure loss when the exhaust gas is allowed to flow may become large in case the honeycomb structure 100 is used as the catalyst carrier to support the catalyst.

In the center part 6 of the honeycomb structure 100 of this embodiment, the opening percentage of the cells 2 is preferably 70-90%, more preferably 75-85%, and particularly preferably 78-83%. If the opening percentage of the cells 2 is smaller than 70%, the pressure loss may become large when the exhaust gas is allowed to flow, and the exhaust gas may not flow smoothly. If the opening percentage of the cells 2 is greater than 90%, the strength of the center part 6 may tend to decrease.

In the center part 6 of the honeycomb structure 100 of this embodiment, the average particle diameter of the silicon carbide particle (aggregate) of the honeycomb structure part 4 is preferably 3-50 micrometers, and more preferably 3-40 micrometers. By having the average particle diameter of the silicon carbide particle, which constitutes the honeycomb structure part 4, in the above-mentioned range, it is possible for the honeycomb structure part 4 to have the electric resistivity of 1-200 Ωcm at 400 degrees C. If the average particle diameter of the silicon carbide particle is smaller than 3 micrometers, the electric resistivity of the honeycomb structure part 4 may become large. If the average particle diameter of the silicon carbide particle is larger than 50 micrometers, the electric resistivity of the honeycomb structure part 4 may become small. In addition, if the average particle diameter of the silicon carbide particle is larger than 50 micrometers, the raw material for the forming process may clog at the die for extrusion molding when a honeycomb formed body is formed by extruding.

In the center part 6 of the honeycomb structure 100 of this embodiment, the electric resistivity of the honeycomb structure part 4 is 1-200 Ωcm, preferably 1-100 Ωcm, more preferably 1-40 Ωcm, and particularly preferably 10-35 Ωcm. If the electric resistivity of the honeycomb structure part 4 is smaller than 1 Ωcm, an excessive current may flow when, for example, the honeycomb structure 100 is supplied with electricity from a high voltage power source of 200V or higher voltage. If the electric resistivity of the honeycomb structure part 4 is greater than 200 Ωcm, the current may not flow easily and sufficient heat generation may not take place when, for example, the honeycomb structure 100 is supplied with electricity from a high voltage power source of 200V or higher voltage. The electric resistivity of the honeycomb structure part is a value measured by a four-terminal method.

In the center part 6 of the honeycomb structure 100 of this embodiment, the electric resistivity of each electrode 21 is preferably lower than the electric resistivity of the honeycomb structure part 4. More preferably the electric resistivity of the electrode 21 is equal to or lower than 20% of the electric resistivity of the honeycomb structure part 4, and particularly preferably the electric resistivity of the electrode 21 is 1-10% of the electric resistivity of the honeycomb structure part 4. When the electric resistivity of the electrode 21 is equal to or lower than 20% of the electric resistivity of the honeycomb structure part 4, the electrode 21 functions as electrode in a more effective manner.

In the center part 6 of the honeycomb structure 100 of this embodiment, the following is met when the material of the honeycomb structure part 4 is the silicon-silicon carbide composite material. Firstly, a sum of the "mass of the silicon carbide particle as aggregate", which is contained in the honeycomb structure part 4, and the "mass of the silicon as binder", which is contained in the honeycomb structure part 4 is referred to as the total amount. The percentage of the "mass of the silicon as binder" contained in the honeycomb structure part 4 relative to the total amount is preferably 10-40 mass %, and more preferably 15-35 mass %. If the percentage of the mass of the silicon as binder contained in the honeycomb structure part 4 relative to the total amount is lower than 10 mass %, the strength of the honeycomb structure may decrease. If the percentage of the mass of the silicon as binder contained in the honeycomb structure part 4 relative to the total amount is higher than 40 mass %, the shape may not be maintained during sintering.

In the center part 6 of the honeycomb structure 100 of this embodiment, the density (g/cm$^3$) of the honeycomb structure part 4 is preferably 1.20-2.10 g/cm$^3$. The density (g/cm$^3$) of the honeycomb structure part 4 is more preferably 1.48-1.91 g/cm$^3$, and particularly preferably 1.53-1.86 g/cm$^3$. It should be noted that the density of the honeycomb structure part 4 is a value obtained by dividing the mass of the honeycomb structure part by the volume of the honeycomb structure part. The volume of the honeycomb structure part includes the volume of the cells.

In the center part 6 of the honeycomb structure 100 of this embodiment, the specific heat (J/kg·K) of the honeycomb structure part 4 is preferably 500-1000 J/kg·K. The specific heat (J/kg·K) of the honeycomb structure part 4 is more preferably 600-800 J/kg·K, and particularly preferably 650-700 J/kg·K. The specific heat is a value measured by the DSC (Differential Scanning Calorimetry) method.

The porosity of the partition wall 1 of the honeycomb structure part 4 is preferably 30-60%, and more preferably 35-45%. If the porosity of the partition wall 1 is smaller than 30%, deformation may become large upon sintering. If the porosity of the partition wall 1 exceeds 60%, the strength of the honeycomb structure may decrease. The porosity is a value measured by a mercury porosimeter.

The average pore diameter of the partition wall 1 of the honeycomb structure part 4 is preferably 2-15 micrometers, and more preferably 4-8 micrometers. If the average pore diameter of the partition wall 1 is smaller than 2 micrometers, the electric resistivity may become too large. If the average pore diameter of the partition wall 1 is greater than 15 micrometers, the electric resistivity may become too small. The average pore diameter is a value measured by a mercury porosimeter.

The thickness of the outer circumferential wall 3, which constitutes the outer circumference of the center part 6 of the honeycomb structure 100 of this embodiment, is preferably 0.1-2 mm. If the thickness of the outer circumferential wall 3 is smaller than 0.1 mm, the strength of the honeycomb structure 100 may decrease. If the thickness of the outer circumferential wall 3 is greater than 2 mm, that area of the partition wall where the catalyst is loaded may become small. It is preferred that the outer circumferential wall 3 may extend around the entire circumference of the center part 6.

In the center part 6 of the honeycomb structure 100 of this embodiment, the shape of each cell 2, when viewed in the cross section in a direction perpendicular to the extending direction of the cells 2, is preferably a quadrangle, a hexagon, an octagon or a combination of any of these shapes. With the cells having such shape, the pressure loss becomes small when the exhaust gas is allowed to flow in the honeycomb structure 100. Thus, when the catalyst is loaded on the honeycomb structure and the honeycomb structure is used as a catalyst body, the catalyst body has a remarkable purification capability.

The shape of the center part 6 of the honeycomb structure 100 of this embodiment is not limited to a particular shape. For example, the shape of the center part 6 may be cylindrical with a circular bottom (cylindrical shape), cylindrical with an oval bottom, or cylindrical with a polygonal bottom (a quadrangle, a pentagon, a hexagon, a heptagon, an octagon or the like). The size of the bottom of the honeycomb structure is preferably 2000-20000 mm², and more preferably 4000-10000 mm². The length of the honeycomb structure in the center axis direction is preferably 50-200 mm, and more preferably 75-150 mm.

The thermal expansion coefficient of the center part 6 of the honeycomb structure 100 of this embodiment is preferably $3.5 \times 10^{-6}$/K to $5.5 \times 10^{-6}$/K, more preferably $4 \times 10^{-6}$/K to $5 \times 10^{-6}$/K and particularly preferably $4 \times 10^{-6}$/K to $4.5 \times 10^{-6}$/K. If the thermal expansion coefficient of the center part 6 is greater than $5.5 \times 10^{-6}$/K, the cracking may easily occur during usage.

As shown in FIG. 1, an electrode terminal 22 is preferably arranged to each of the electrode pair 21, 21 provided at the center part 6. External electric wiring may be connected to the respective electrode terminals 22 to apply a voltage to the electrodes 21 respectively so as to cause the center part 6 to generate heat.

The electrode terminal 22 of each electrodes 21, 21 is preferably arranged at the "center in the cross section taken in the direction perpendicular to the extending direction of the cells 2 and also at the center in the extending direction of the cells 2. It should be noted that the position (location) of the electrode terminal 22 on the associated electrode 21 is not limited to the above-mentioned position (center), and may be any suitable position on the electrode 21 depending upon given conditions.

When the main components of the electrodes 21 are the silicon carbide particle and silicon, it is preferred that the main components of the electrode terminals 22 are also the silicon carbide particle and silicon. When the main components of the electrode terminals 22 are the silicon carbide particle and silicon, the components of the electrodes 21 and the components of the electrode terminals 22 are the same (or similar), and therefore the electrodes 21 and the electrode terminals 22 have the same (or similar) thermal expansion coefficient. Because the materials of the electrodes 21 and the electrode terminals 22 are the same (or similar), the strength of bonding between the electrode 21 and the electrode terminal 22 becomes also high. Accordingly, even when a thermal stress is applied on the honeycomb structure, the electrode terminals 22 would not peel off from the electrodes 21, and the bonding part between the electrode terminals 22 and the electrodes 21 would be prevented from breakage. In this embodiment, the "main components of the electrode terminal 22 being the silicon carbide particle and silicon" means that the electrode terminal 22 contains the silicon carbide particle and silicon at 90 mass % or more of the entire mass.

The shape of the electrode terminal 22 is not limited to a particular shape as long as it is possible to connect the electrode terminal to the associated electrode 21 and to connect the electric wiring on the electrode terminal. As shown in FIG. 1, for example, the electrode terminal 22 preferably has a circular column shape.

The width of each electrode terminal 22 is preferably 3-15 mm. With the electrode terminal width being in such range, it is possible to securely connect the electric wiring on the electrode terminal 22. If the width of the electrode terminal 22 is smaller than 3 mm, the electrode terminal 22 may tend to break. If the width of the electrode terminal 22 is greater than 15 mm, the coupling of the electric wiring to the electrode terminal may become difficult. Preferably the electrode terminal 22 has a length such that the electrode terminal 22 protrudes 3-20 mm from the outer circumference of the honeycomb structure 100. With the electrode terminal having such length, it is possible to securely connect the electric wiring to the electrode terminal 22. If the protruding length of the electrode terminal 22 from the outer circumference of the honeycomb structure 100 is shorter than 3 mm, the connection of the electric wiring to the electrode terminal may become difficult. If the protruding length of the electrode terminal 22 from the outer circumference of the honeycomb structure 100 is longer than 20 mm, the electrode terminal 22 may become easy to break.

The electric resistivity of each electrode terminal 22 is preferably 0.1-2.0 Ω·cm, and more preferably 0.1-1.0 Ωcm. With the electric resistivity of the electrode terminal 22 being in such range, it is possible to effectively supply the current to the electrode 21 from the electrode terminal 22 in the pipe through which a high temperature exhaust gas flows. If the electric resistivity of the electrode terminal 22 is greater than 2.0 Ω·cm, the current is difficult to flow and therefore the supplying of the current to the electrode 21 may become difficult.

The porosity of the electrode terminal 22 is preferably 30-45%, and more preferably 30-40%. With the porosity of the electrode terminal 22 being in such range, it is possible to obtain an appropriate electric resistivity. The porosity is a value measured by a mercury porosimeter.

The average pore diameter of the electrode terminal 22 is preferably 5-20 micrometers, and more preferably 7-15 micrometers. With the average pore diameter of the electrode terminal 22 being in such range, it is possible to obtain an appropriate electric resistivity. The average pore diameter is a value measured by a mercury porosimeter.

When the main components of the electrode terminal 22 are the silicon carbide particle and silicon, the average particle diameter of the silicon carbide particle contained in the electrode terminal 22 is preferably 10-60 micrometers and more preferably 20-60 micrometers. With the average particle diameter of the silicon carbide particle contained in the electrode terminal 22 being in such range, the electric resistivity of the electrode terminal 22 can be set to 0.1-2.0 Ωcm.

The percentage of the mass of the silicon contained in the electrode terminal 22 relative to the "sum of the mass of silicon carbide particle and the mass of silicon" contained in the electrode terminal 22 is preferably 20-40 mass % and more preferably 25-35 mass %. It is easier to obtain the electric resistivity of 0.1-2.0 Ωcm when the percentage of the mass of the silicon relative to the total mass of the silicon carbide particle and silicon contained in the electrode terminal 22 is in the above-mentioned range.

(1-2) Outer Circumferential Part

The outer circumferential part 36 of the honeycomb structure 100 of this embodiment is provided around the outer circumference of the center part 6. The outer circumferential part 36 has a porous partition wall (partition wall of the outer circumferential part) 31, which defines a plurality of cells (cells of the outer circumferential part) 32 extending from one end face to the other end face and serving as fluid passages, and an outer circumferential wall (outer circumferential wall of the outer circumferential part) 33 situated at the outermost circumferential position.

In the honeycomb structure 100 of this embodiment, the outer circumferential part 36 includes eight honeycomb segments 36a arranged annularly around the outer circumference of the center part 6. The outer circumferential part 36 is configured such that the "honeycomb segments 36a are connected to each other" by bonding parts and the "honeycomb segments 36a are connected to the center part 6" by bonding parts. The "eight honeycomb segments 36a being arranged annularly around the outer circumference of center part 6" means that the state (form) which the eight honeycomb segments 36a are arranged is annular when viewed in the cross section taken in the direction perpendicular to the extending direction of the cells 32. Specifically, the eight honeycomb segments are connected to form a single annular shape. The honeycomb segment 36a has a porous partition wall, which defines a plurality of cells extending from one end face to the other end face and serving as fluid passages, and an outer circumferential wall situated at the outermost circumferential position. A plurality of honeycomb segments 36a is bonded into an annular shape to form the outer circumferential part 36.

As illustrated in FIGS. 1 to 3, the outer circumferential part 36 preferably includes a plurality of honeycomb segments 36a and the bonding parts 37 for joining and bonding the honeycomb segments 36a to each other. Because of such configuration, the bonding parts located between each two honeycomb segments function as shock absorbers, and therefore it is possible to effectively prevent the occurrence of the cracking in the outer circumferential part, caused by thermal shock. It should be noted that the outer circumferential part 36 may not have a plurality of honeycomb segments 36a, but the outer circumferential part 36 may be formed from a single annular honeycomb structure body. When such structure is employed, the honeycomb structure 100 of this embodiment may have the center part 6 located in center hole of the annular outer circumferential part 36.

When the outer circumferential part 36 has a plurality of honeycomb segments 36a and the bonding parts 37 that joins and bonds the honeycomb segments 36a to each other, the number of the honeycomb segments 36a is preferably two to eight, more preferably two to six, and particularly preferably two to four. If there are more than eight honeycomb segments, many bonding parts are necessary and the exhaust gas may not flow easily in the outer circumferential part 36. It should be noted that although all the honeycomb segments 36a preferably have the same shape, the honeycomb segments 36a may have different shapes.

The overall shape of the outer circumferential part 36 of the honeycomb structure 100 of this embodiment is not limited to a particular shape. The inner circumferential shape of the outer circumferential part (i.e., the side in contact with the center part) is preferably a shape which follows the outer circumferential shape of the center part. Because the shape of the outer surface of the outer circumferential part 36 is the shape of outer circumference of the honeycomb structure 100, it is preferred that the shape of the outer surface of the outer circumferential part 36 takes a desired outer shape of the honeycomb structure 100.

As shown in FIG. 1, the outer circumferential part 36 preferably has openings 38 for the electrode terminals in order to outwardly expose the electrode terminals 22 provided on the electrodes 21 of the center part 6. In the honeycomb structure 100 shown in FIG. 1, two honeycomb segments 36a, 36a have concave portions 36c, 36c in the side edges 36b, 36b, respectively. These two honeycomb segments 36a, 36a are abutted (coupled) to each other such that the concave portions 36c, 36c of the two side edges 36b, 36b meet each other to form a single opening 38 for the electrode terminal. Alternatively, an opening may be formed in the outer circumferential part 36 such that the opening penetrates from the "outer circumferential wall 33 of the outer circumferential part 36" to the center part 6 and may be used as the opening 38 for the electrode terminal. The opening area of the electrode terminal opening 38 is preferably 3-30% of the cross-sectional area, when viewed in the cross section taken in a direction perpendicular to the center axis of the electrode terminal 22 (i.e., direction extending outward from the center part 6), more preferably 5-25% of the cross-sectional area, and particularly preferably 10-20% of the cross-sectional area. If the opening area of the electrode terminal opening 38 is smaller than 3% of the cross-sectional area, the electrode terminal 22 may easily come into contact. If the opening area of the electrode terminal opening 38 is greater than 30% of the cross-sectional area, foreign matters may enter from the electrode terminal opening 38 and may adhere to the electrode 21 of the center part 6 and the like.

In the honeycomb structure 100 of this embodiment, the thermal expansion coefficient of the outer circumferential part 36 is preferably $0.1 \times 10^{-6}$/K to $3.0 \times 10^{-6}$/K. The thermal expansion coefficient of the outer circumferential part 36 is more preferably $0.5 \times 10^{-6}$/K to $2.5 \times 10^{-6}$/K, and particularly preferably $0.7 \times 10^{-6}$/K to $2.3 \times 10^{-6}$/K. If the thermal expansion coefficient of the outer circumferential part 36 is greater than $3.0\times10^{-6}$/K, cracking may tend to occur during usage.

In the honeycomb structure 100 of this embodiment, the electric resistivity of the outer circumferential part 36 is preferably equal to or greater than 1000 Ωcm, and more preferably equal to or greater than 100000 Ωcm. With the electric resistivity of the outer circumferential part 36 being equal to or greater than 1000 Ωcm, it is possible to maintain the insulation between the center part 6 and the outer member (can or the like) when the honeycomb structure 100 is inserted in the can. From the view point of maintaining the insulation, it is preferred that the electric resistivity of the outer circumferential part 36 has a high value. The electric resistivity of the outer circumferential part 36 is a value at 400 degrees C.

The ratio R (outer circumferential part 36/center part 6) of the electric resistivity (Ωcm) of the outer circumferential part 36 to the electric resistivity (Ωcm) of the center part 6 (honeycomb structure part 4), is preferably equal to or greater than 100, more preferably equal to or greater than 500, and particularly preferably equal to or greater than 1000. With the ratio R being in such range, it is possible to ensure the insulation of the outer circumferential part 36 in an improved manner when the center part 6 is supplied with electricity. If the ratio R is smaller than 100, the insulation of the outer circumferential part 36 may become difficult to maintain upon electricity application to the center part 6.

The material of the outer circumferential wall 33 and partition wall 31 of the outer circumferential part 36 is preferably cordierite, aluminum titanate, lithium aluminum silicate, silicon nitride, zircon, zirconium phosphate or the like. Use of such material can set the thermal expansion coefficient and electric resistivity of the outer circumferential part to preferred values.

In the outer circumferential part 36 of the honeycomb structure 100 of this embodiment, the partition wall thickness is 50-200 micrometers and preferably 70-130 micrometers. With the partition wall thickness being in such range, it is possible to prevent the pressure loss from becoming too large even when the outer circumferential part 36 is loaded with the catalyst and the exhaust gas is allowed to flow therethrough. If the partition wall thickness is smaller than 50 micrometers, the strength of the outer circumferential part 36 may decrease. If the partition wall thickness is greater than 200 micrometers, the pressure loss may become large when the exhaust gas is allowed to flow through while the outer circumferential part 36 is loaded with the catalyst.

The cell density of the outer circumferential part 36 of the honeycomb structure 100 of this embodiment is preferably 40-150 cells/cm$^2$, and more preferably 70-100 cells/cm$^2$. With the cell density being in such range, it is possible to enhance the purification performance of the catalyst while the pressure loss when the exhaust gas is allowed to flow being kept low. If the cell density of the outer circumferential part 36 is smaller than 40 cells/cm$^2$, the catalyst loading area may become small. If the cell density of the outer circumferential part 36 is greater than 150 cells/cm$^2$, the pressure loss of the exhaust gas may become large when the exhaust gas flows in the outer circumferential part with the catalyst loaded.

In the outer circumferential part 36 of the honeycomb structure 100 of this embodiment, the opening percentage of the cells 32 is preferably 70-90% and more preferably 75-85%. If the opening percentage of the cells 32 is smaller than 70%, the pressure loss when exhaust gas is allowed to flow may become large and the exhaust gas may not flow easily. If the exhaust gas does not flow easily in the outer circumferential part, the effect of maintaining the temperature of the center part may decrease, and the effect of preventing the occurrence of the cracking in the center part may decrease. If the opening percentage of the cells 32 is greater than 90%, the strength of the outer circumferential part 36 may tend to decrease.

It is preferred that the cells 32 are open at both of the end faces of the outer circumferential part 36 (the cells 32 open in both ends) so that the exhaust gas flows sufficiently. With this structure, it is possible to effectively keep the temperature of the center part 6. This in turn results in the effective prevention of the occurrence of the cracking in the center part 6. If plugging portions are provided at the end (s) of the cells 32, it hinders the flow of the exhaust gas, which is not preferred.

The density (g/cm$^3$) of the outer circumferential part 36 of the honeycomb structure 100 according to this embodiment is preferably 0.75-1.75 g/cm$^3$, and more preferably 1.00-1.50 g/cm$^3$. The density of the outer circumferential part 36 is a value obtained by the mass of the outer circumferential part 36 divided by the volume of the outer circumferential part 36. The volume of the outer circumferential part 36 includes the volume of the cells.

The specific heat (J/kg·K) of the outer circumferential part 36 of the honeycomb structure 100 according to this embodiment is preferably 500-1000 J/kg·K, more preferably 700-900 J/kg·K, and particularly preferably 750-850 J/kg·K. The specific heat is a value measured by the DSC (Differential Scanning Calorimetry) method.

The porosity of the partition wall 31 of the outer circumferential part 36 is preferably 30-70%, and more preferably 40-60%. If the porosity of the partition wall 31 of the outer circumferential part 36 is less than 30%, the deformation may become large upon sintering. If the porosity of the partition wall 31 of the outer circumferential part 36 exceeds 70%, the strength of the outer circumferential part 36 may decrease. The porosity is a value measured by a mercury porosimeter.

The average pore diameter of the partition wall of the outer circumferential part 36 is preferably 2-15 micrometers, and more preferably 4-8 micrometers. The average pore diameter is a value measured by a mercury porosimeter.

The thickness of the outer circumferential wall 33 that defines the outer surface of the outer circumferential part 36 of the honeycomb structure 100 according to this embodiment is preferably 0.1-2 mm. If the thickness of the outer circumferential wall 33 is smaller than 0.1 mm, the strength of the outer circumferential part 36 may decrease. If the thickness of the outer circumferential wall 33 is greater than 2 mm, cracking may tend to occur because of the temperature difference between the outer circumferential wall and partition wall of the outer circumferential part and/or the temperature differences inside the outer circumferential wall. It is preferred that the outer circumferential wall 33 of the outer circumferential part 36 is at least provided at the outermost circumferential portion of the honeycomb structure 100. For example, the outer circumferential part 36 may have a configuration that the outer circumferential wall is not provided at that part of the outer circumferential part 36 which faces the center part 6 (that part which contacts via the bonding part(s)). When the outer circumferential part 36 is made from a plurality of honeycomb segments 36a, the honeycomb segments may be configured such that the outer circumferential wall is not provided at those parts of the honeycomb segments 36a which abut to each other (those parts of the honeycomb segments which contact each other via the bonding parts). Alternatively, the outer circumferential wall 33 may be provided around the entire outer face of the outer circumferential part 36. When the outer circumferential part 36 is made from a plurality of honeycomb segments 36a, the outer circumferential wall 33 may be provided around the entire outer face of the honeycomb segments 36a.

In the outer circumferential part 36 of the honeycomb structure 100 according to this embodiment, the cross-sectional shape of the cell 32, when viewed in the cross section in the direction perpendicular to the extending direction of the cells 32, is preferably a quadrangle, a hexagon, an octagon or a combination of any of these shapes. With the cells having such shape, the pressure loss becomes small when the exhaust gas flows in the outer circumferential part 36. Thus, the outer circumferential part can demonstrate an excellent purifying performance when the exhaust gas is purified by the outer circumferential part 36 with the catalyst loaded.

In the honeycomb structure 100 of this embodiment, the bonding parts 37 are obtained by heat treating a bonding material. The main components of the bonding material are inorganic particle and inorganic adhesive. The subcomponents of the bonding material are organic binder, surfactant, foamable resin, water and the like. The inorganic particle includes, for example, plate particle, spherical particle, massive particle, fiber particle, acicular particle, and the like. The inorganic adhesive includes, for example, colloidal silica ($SiO_2$ sol), colloidal alumina (alumina sol), various types of oxide sol, ethyl silicate, liquid glass, silica polymer, aluminum phosphate and the like. Preferably the main components of the bonding material contain a ceramic powder, which is in common with the components of the honeycomb segments 36a. Preferably the main components of the bonding material do not contain a fiber particle such as ceramic fiber in view of health issues or the like. Preferably the main components of the bonding material contain the plate particle. The plate particle includes, for example, mica, talc, boron nitride, glass flake or the like.

In the honeycomb structure 100 of this embodiment, the thickness of the bonding part 37 is preferably 0.1-5 mm, more preferably 0.3-3 mm, and particularly preferably 0.5-2 mm. If the thickness of the bonding part 37 is smaller than 0.1 mm, the honeycomb segments may tend to contact each other or the honeycomb segments (outer circumferential part) may tend to contact the center part. If the thickness of the bonding part 37 is greater than 5 mm, the pressure loss when the exhaust gas is allowed to flow through the honeycomb structure 100 may tend to easily become large.

The porosity of the bonding part 37 is preferably 40-70%, more preferably 50-65%, and particularly preferably 55-65%. If the porosity of the bonding part 37 is smaller than 40%, the bonding parts may tend to be hard, and therefore the shock absorbing function of the bonding parts may tend to decrease. If the porosity of the bonding part 37 is greater than 70%, the bonding parts may tend to be soft or elastic, and therefore the shock absorbing function of the bonding parts may tend to decrease.

The shape of the honeycomb structure 100 of this embodiment is preferably cylindrical with a circular bottom (circular cylinder), cylindrical with an oval bottom, or cylindrical with a polygonal bottom (quadrangle, pentagon, hexagon, heptagon, octagon or the like). The bottom area size of the honeycomb structure 100 is preferably 2000-20000 $mm^2$, and more preferably 5000-15000 $mm^2$. The length of the honeycomb structure in the center axial direction of the honeycomb structure is preferably 50-200 mm, and more preferably 75-150 mm.

The isostatic strength of the honeycomb structure 100 of this embodiment is preferably equal to or greater than 1 MPa, and more preferably equal to or greater than 3 MPa. The isostatic strength is more preferred as the isostatic strength value increases. However, if the material, structure and other factors of the honeycomb structure 100 are taken into account, the upper limit of the isostatic strength is approximately 6 MPa. If the isostatic strength of the honeycomb structure 100 is smaller than 1 MPa, the honeycomb structure may tend to break when the honeycomb structure is used as the catalyst carrier or the like. The isostatic strength is a value measured in the water under a hydrostatic pressure.

(2) Method of Manufacturing Honeycomb Structure

Now, an exemplary method of manufacturing the honeycomb structure according to the present invention will be described. Firstly, a method of making the center part will be described. It should be noted that the outer circumferential part may be made prior to the center part, or vice versa.

(2-1) Center Part (Sintered Body of the Center Part)

A raw material for forming is prepared by adding a metallic silicon powder (metallic silicon), a binder, a surfactant, a pore former, water and the like to a silicon carbide powder (silicon carbide). Preferably the mass of the metallic silicon is 10-40 mass % relative to the sum of the mass of the silicon carbide powder and the mass of the metallic silicon. The average particle diameter of the silicon carbide particle in the silicon carbide powder is preferably 3-50 micrometers and more preferably 3-40 micrometers. The average particle diameter of the metallic silicon (metallic silicon powder) is preferably 2-35 micrometers. The average particle diameters of the silicon carbide particle and the metallic silicon (metallic silicon particle) are values measured by laser diffractometry. The silicon carbide particle is a fine particle of silicon carbide constituting the silicon carbide powder, and the metallic silicon particle is a fine particle of metallic silicon constituting the metallic silicon powder. It should be noted that the above-mentioned composition of the raw material for forming is the composition when the material of the honeycomb structure is the silicon-silicon carbide based composite material. If the material of the honeycomb structure is the silicon carbide, no metallic silicon is added.

The binder may be methylcellulose, hydroxypropyl methylcellulose, hydroxypropoxyl cellulose, hydroxyethyl cellulose, carboxymethyl cellulose, polyvinyl alcohol or the like. Among those materials, it is preferred to use methylcellulose and hydroxypropoxyl cellulose together. Preferably the content of the binder is 2.0-10.0 parts by mass when the total mass of the silicon carbide powder and metallic silicon powder is taken as 100 parts by mass.

Preferably the water content is 20-60 parts by mass when the total mass of the silicon carbide powder and metallic silicon powder is taken as 100 parts by mass.

The surfactant may be ethylene glycol, dextrin, fatty acid soap, polyalcohol or the like. Any one of these materials of the surfactant may be used, or two or more materials of these materials may be used in combination. Preferably the content of the surfactant is 0.1-2.0 parts by mass when the total mass of the silicon carbide powder and metallic silicon powder is taken as 100 parts by mass.

The pore former is not limited to a particular pore former as long as it forms pores upon sintering. For example, the pore former may be graphite, starch, foamable resin, water-absorbable resin, silica gel or the like. Preferably the content of the pore former is 0.5-10.0 parts by mass when the total mass of the silicon carbide powder and metallic silicon powder is taken as 100 parts by mass. Preferably the average particle diameter of the pore former is 10-30 micrometers. If the average particle diameter of the pore former is smaller than 10 micrometers, the pore former may not be able to form pores sufficiently. If the average particle diameter of the pore former is greater than 30 micrometers, the pore former may clog at the die during the forming. The average particle diameter of the pore former is a value measured by laser diffractometry.

Next, the raw material for forming is kneaded to form the kneaded clay. The method of kneading the raw material for forming to prepare the kneaded clay is not limited to a particular method. For example, the method of kneading the raw material for the forming process may be performed with a kneader or a vacuum clay kneader.

Subsequently, the kneaded clay is extruded to form the honeycomb formed body. Preferably the extrusion process is carried out with the die which can provide the honeycomb formed body with a desired entire shape, a desired cell shape, a desired partition wall thickness, a desired cell concentration and the like. The material of the die is preferably an ultrahard metal which is difficult to wear. The honeycomb formed body has a partition wall to define a plurality of cells, which serve as fluid passages, and an outer circumferential wall around the partition wall.

The shape, size, partition wall thickness, cell density, outer circumferential wall thickness and the like of the honeycomb formed body are appropriately decided to conform to the desired structure of the center part to be manufactured, while shrinkages upon drying and sintering are taken into account.

It is preferred that the resulting honeycomb formed body is subjected to the drying process to obtain a dried honeycomb body (center part). The drying method is not limited to a particular method. For example, the drying may be carried out by an electromagnetic wave heating such as microwave heating or high frequency dielectric heating, or by an external heating such as hot air drying or superheated steam drying. Among these, it is preferred that the electromagnetic wave heating is firstly used to dry out a certain amount of water and then the external heating is used to dry out the remaining water because such approach can quickly and uniformly dry the entire formed body without causing cracking. Regarding the drying conditions, the electromagnetic wave heating is carried out to remove the water by 30-99 mass % (with respect to the water prior to the drying), and then the external heating is carried out to remove the water to 3 mass % or less. The electromagnetic wave heating is preferably performed with the dielectric heating, and the external heating is preferably performed with the hot air drying.

If the length of the dried honeycomb body (center part) in the center axis direction is not the desired value, then it is preferred that both end faces (both ends) are cut to have the desired length. The cutting method is not limited to a particular method. For example, the cutting may be carried out with a circular saw cutting machine or the like.

Next, an electrode forming raw material for forming the electrodes is prepared. When the main components of the electrode are silicon carbide and silicon, the electrode forming raw material is preferably prepared by adding the predetermined additives to the silicon carbide powder and silicon powder and kneading them.

Specifically, the metallic silicon powder (metallic silicon), binder, surfactant, pore former, water and the like are added to the silicon carbide powder (silicon carbide), and they are kneaded to prepare the raw material for forming the electrodes. Preferably the mass of the metallic silicon is 20-40 parts by mass when the total mass of the silicon carbide powder and metallic silicon is taken as 100 parts by mass. The average particle diameter of the silicon carbide particle in the silicon carbide powder is preferably 10-60 micrometers. The average particle diameter of the metallic silicon powder (metallic silicon) is preferably 2-20 micrometers. If the average particle diameter of the metallic silicon powder is smaller than 2 micrometers, the electric resistivity may become too small. If the average particle diameter of the metallic silicon powder is larger than 20 micrometers, the electric resistivity may become too large. The average particle diameters of the silicon carbide particle and metallic silicon (metallic silicon particle) are values measured by laser diffractometry. The silicon carbide particle is a fine particle of silicon carbide constituting the silicon carbide powder, and the metallic silicon particle is a fine particle of metallic silicon constituting the metallic silicon powder.

The binder may be methylcellulose, hydroxypropyl methylcellulose, hydroxypropoxyl cellulose, hydroxyethyl cellulose, carboxymethyl cellulose, polyvinyl alcohol or the like. Among those materials, it is preferred to use methylcellulose and hydroxypropoxyl cellulose together. Preferably the content of the binder is 0.1-5.0 parts by mass when the total mass of the silicon carbide powder and metallic silicon powder is taken as 100 parts by mass.

Preferably the water content is 15-60 parts by mass when the total mass of the silicon carbide powder and metallic silicon powder is taken as 100 parts by mass.

The surfactant may be ethylene glycol, dextrin, fatty acid soap, polyalcohol or the like. Any one of these materials may be used, or two or more materials of these materials may be used in combination. Preferably the content of the surfactant is 0.1-2.0 parts by mass when the total mass of the silicon carbide powder and metallic silicon powder is taken as 100 parts by mass.

The pore former is not limited to a particular pore former as long as it forms pores upon sintering. For example, the pore former may be graphite, starch, foamable resin, water-absorbable resin, silica gel or the like. Preferably the content of the pore former is 0.1-5.0 parts by mass when the total mass of the silicon carbide powder and metallic silicon powder is taken as 100 parts by mass. Preferably the average particle diameter of the pore former is 10-30 micrometers. If the average particle diameter of the pore former is smaller than 10 micrometers, the pore former may not be able to form pores sufficiently. If the average particle diameter of the pore former is greater than 30 micrometers, the pore former may tend to create large pores, and the strength may decrease. The average particle diameter of the pore former is a value measured by laser diffractometry.

Next, the silicon carbide powder (silicon carbide), metallic silicon (metallic silicon powder), binder, surfactant, pore former, water and the like are mixed to obtain a mixture, and this mixture is kneaded to form the electrode forming raw material in the form of paste. The kneading method is not limited to a particular method. For example, a vertical agitator may be used.

Then, the obtained electrode forming raw material is preferably applied onto the side face of the dried honeycomb body (center part). The method of applying the electrode forming raw material onto the side face of the dried honeycomb body (center part) is not limited to a particular method. For example, printing technique may be employed. Preferably, the electrode forming raw material may be applied onto the side face of the dried honeycomb body (center part) to provide a desired shape of the electrodes in the honeycomb structure of the present invention. It is possible to have the desired thickness of the electrode by adjusting the thickness of the applied electrode forming raw material. In this manner, the electrodes are formed by simply applying the electrode forming raw material on the side face of the dried honeycomb body (center part), drying the honeycomb body and sintering the honeycomb body. Thus, it is very easy to form the electrodes.

Next, the electrode forming raw material applied on the side face of the dried honeycomb body (center part) is preferably dried. The drying condition is preferably 50-100 degrees C.

Next, the members for forming the electrode terminals are preferably prepared. The members for forming the electrode terminals are attached to the dried honeycomb body (center part) and become the electrode terminals. The shape of the members for forming the electrode terminals are not limited to a particular shape, but as shown in FIG. 1, for example, a column shape is preferred. Preferably, the obtained members for forming the electrode terminals are attached to those portions of the dried honeycomb body (center part) on which the electrode forming raw material is applied. It should be noted that the preparation of the dried honeycomb body (center part), the preparation of the electrode forming raw material mixture, and the preparation of the raw material for forming the electrode terminals are performed in any order, and the order of these three preparation processes is not limited to a particular order.

Preferably, the members for forming the electrode terminals are obtained by forming and drying a raw material for forming the electrode terminals (raw material for preparing the members for forming the electrode terminals). When the main components of the electrode terminal are the silicon carbide and silicon, the raw material for forming the electrode terminals is preferably prepared by adding predetermined additives to the silicon carbide powder and the silicon powder and kneading them.

Specifically, the metallic silicon powder (metallic silicon), binder, surfactant, pore former, water and the like are added to the silicon carbide powder (silicon carbide), and they are kneaded to prepare the raw material for forming the electrode terminals. Preferably the mass of the metallic silicon is 20-40 mass % relative to the sum of the mass of the silicon carbide powder and the mass of the metallic silicon. The average particle diameter of the silicon carbide particle in the silicon carbide powder is preferably 10-60 micrometers. The average particle diameter of the metallic silicon powder (metallic silicon) is preferably 2-20 micrometers. If the average particle diameter of the metallic silicon powder is smaller than 2 micrometers, the electric resistivity may become too small. If the average particle diameter of the metallic silicon powder is larger than 20 micrometers, the electric resistivity may become too large. The average particle diameters of the silicon carbide particle and metallic silicon particle (metallic silicon) are values measured by laser diffractometry. The silicon carbide particle is a fine particle of silicon carbide constituting the silicon carbide powder, and the metallic silicon particle is a fine particle of metallic silicon constituting the metallic silicon powder.

The binder may be methylcellulose, hydroxypropyl methylcellulose, hydroxypropoxyl cellulose, hydroxyethyl cellulose, carboxymethyl cellulose, polyvinyl alcohol or the like. Among those materials, it is preferred to use methylcellulose and hydroxypropoxyl cellulose together. Preferably the content of the binder is 2.0-10.0 parts by mass when the total mass of the silicon carbide powder and metallic silicon powder is taken as 100 parts by mass.

Preferably the water content is 20-40 parts by mass when the total mass of the silicon carbide powder and metallic silicon powder is taken as 100 parts by mass.

The surfactant may be ethylene glycol, dextrin, fatty acid soap, polyalcohol or the like. Any one of these materials may be used, or two or more materials of these materials may be used in combination. Preferably the content of the surfactant is 0.1-2.0 parts by mass when the total mass of the silicon carbide powder and metallic silicon powder is taken as 100 parts by mass.

The pore former is not limited to a particular pore former as long as it forms pores upon sintering. For example, the pore former may be graphite, starch, foamable resin, water-absorbable resin, silica gel or the like. Preferably the content of the pore former is 0.1-5.0 parts by mass when the total mass of the silicon carbide powder and metallic silicon powder is taken as 100 parts by mass. Preferably the average particle diameter of the pore former is 10-30 micrometers. If the average particle diameter of the pore former is smaller than 10 micrometers, the pore former may not be able to form pores sufficiently. If the average particle diameter of the pore former is greater than 30 micrometers, the pore former may tend to create large pores, and the strength may decrease. The average particle diameter of the pore former is a value measured by laser diffractometry.

Next, the silicon carbide powder (silicon carbide), metallic silicon (metallic silicon powder), binder, surfactant, pore former, water and the like are mixed to obtain a mixture, and this mixture is kneaded to form the raw material for forming the electrode terminals. The kneading method is not limited to a particular method. For example, a kneading machine may be used.

A method of forming the obtained raw material for forming the electrode terminals to a shape of the electrode terminal-forming member may not be limited to a particular method. For example, an extrusion may be carried out and then appropriate machining may be carried out.

After forming the raw material for forming the electrode terminals to a shape of the electrode terminal-forming member, the formed raw material is preferably dried to obtain the electrode terminal-forming members. The drying condition is preferably 50-100 degrees C.

Then, the electrode terminal-forming members are preferably attached to the honeycomb formed body, on which the electrode forming raw material is applied. The method of attaching the electrode terminal-forming members to the dried honeycomb body (center part) (those portions of the dried honeycomb body (center part) on which the electrode forming raw material is applied) is not limited to a particular method. Preferably, the electrode terminal-forming members may be attached onto the honeycomb formed body using the electrode forming raw material. For example, the electrode forming raw material is applied on those faces of the electrode terminal-forming members "which will be attached to (will contact) those portions of the dried honeycomb body (center part) on which the electrode forming raw material is applied". Subsequently, the electrode terminal-forming members are preferably attached to the dried honeycomb body (center part) while those "faces on which the electrode forming raw material is applied" contact the dried honeycomb body (center part).

Then, the "dried honeycomb body (center part) on which the electrode forming raw material is applied and the electrode-terminal-forming members are attached" is preferably dried to obtain a dried center part. The drying condition is preferably 50-100 degrees C.

In order to remove the binder and the like, the dried center part preferably undergoes calcination to prepare a calcinated body of the center part. The calcination is preferably carried out in the atmosphere at 400-550 degrees C. for 0.5-20 hours. The methods of calcination and sintering are not limited to particular methods. For example, the sintering may be carried out with an electric furnace, a gas furnace or the like.

Next, preferably the calcinated body of the center part which is obtained by the calcination is sintered to obtain the sintered body of the center part. The sintering conditions preferably include heating in an inert atmosphere such as nitrogen or argon at 1400-1500 degrees C. for 1-20 hours.

(2-2) Outer Circumferential Part (Sintered Body of Outer Circumferential Part)

A method of preparing the sintered body of the outer circumferential part will be now described.

A binder, surfactant, pore former, water and the like are added to the cordierite-forming raw material to prepare a raw material for forming. The cordierite-forming raw material is a ceramic raw material that has a chemical composition of silica 42-56 mass %, alumina 30-45 mass % and magnesia 12-16 mass %, and that will become cordierite upon sintering. It should be noted that the above-mentioned method is employed and the raw material for forming has the above-mentioned composition when the material of the outer circumferential part is cordierite. When the material of the outer circumferential part is aluminum titanate, a conventional method for manufacturing a sintered body of aluminum titanate may be employed.

The binder may be methylcellulose, hydroxypropyl methylcellulose, hydroxypropoxyl cellulose, hydroxyethyl cellulose, carboxymethyl cellulose, polyvinyl alcohol or the like. Preferably the content of the binder is 2.0-10.0 parts by mass when the total mass of the cordierite-forming raw materials is taken as 100 parts by mass.

Preferably the content of water is 20-60 parts by mass when the total mass of the cordierite-forming raw materials is taken as 100 parts by mass.

The surfactant may be ethylene glycol, dextrin, fatty acid soap, polyalcohol or the like. Any one of these materials may be used, or two or more materials of these materials may be used in combination. Preferably the content of the surfactant is 0.1-2.0 parts by mass when the total mass of the cordierite-forming raw materials is taken as 100 parts by mass.

The pore former is not limited to a particular pore former as long as it forms pores upon sintering. For example, the pore former may be graphite, starch, foamable resin, water-absorbable resin, silica gel or the like. Preferably the content of the pore former is 0.5-10.0 parts by mass when the total mass of the cordierite-forming raw material is taken as 100 parts by mass. Preferably the average particle diameter of the pore former is 10-30 micrometers. If the average particle diameter of the pore former is smaller than 10 micrometers, the pore former may not be able to form pores sufficiently. If the average particle diameter of the pore former is greater than 30 micrometers, the pore former may clog at the die at the forming process. The average particle diameter of the pore former is a value measured by laser diffractometry.

Next, the raw material for the forming process is kneaded to form the kneaded clay. The method of kneading the forming process raw material to prepare the kneaded clay is not limited to a particular method. For example, the kneading method may be performed with a kneader or a vacuum clay kneader.

Subsequently, the kneaded clay is extruded to form the honeycomb formed body. Preferably the extrusion process is carried out with a die which have a desired overall shape, a desired cell shape, a desired partition wall thickness, a desired cell density and the like. The honeycomb formed body has a partition wall to define a plurality of cells, which serve as fluid passages, and an outer circumferential wall around the partition wall. Preferably the honeycomb formed body has a structure like the honeycomb segment 36a of one embodiment of the honeycomb structure according to the present invention (honeycomb structure 100) as shown in FIGS. 1-3. Preferably a plurality of honeycomb formed bodies, which have shapes like the honeycomb segments 36a, are prepared, and are joined and bonded to finally obtain the outer circumferential part 36 of the honeycomb structure 100.

The shape, size, partition wall thickness, cell density, outer circumferential wall thickness and the like of the honeycomb formed body are appropriately decided to conform to the desired structure of the outer circumferential part to be manufactured, while shrinkages upon drying and sintering are taken into account.

It is preferred that the resulting honeycomb formed body is subjected to drying to obtain a dried body of the outer circumferential part. The drying method is not limited to a particular method. For example, the drying may be carried out by an electromagnetic wave heating such as microwave heating or high frequency dielectric heating, or by an external heating such as hot air drying or superheated steam drying. Among these, it is preferred that the electromagnetic wave heating is firstly used to dry out a certain amount of water and then the external heating is used to dry out the remaining water because such approach can quickly and uniformly dry the entire formed body without causing cracking. Regarding the drying conditions, the electromagnetic wave heating is carried out to remove the water by 30-99 mass % (with respect to the water prior to the drying), and then the external heating is carried out to remove the water to 3 mass % or less. The electromagnetic wave heating is preferably performed with the dielectric heating, and the external heating is preferably performed with the hot air drying.

If the length of the dried body of the outer circumferential part in the center axis direction is not the desired value, then it is preferred that both end faces (both ends) are cut to have the desired length. The cutting method is not limited to a particular method. For example, the cutting may be carried out with a circular saw cutting machine or the like.

In order to remove the binder and the like, the dried body of the outer circumferential part preferably undergoes the calcination to prepare a calcinated body of the outer circumferential part. The calcination is preferably carried out in the atmosphere at 400-550 degrees C. for 0.5-20 hours. The methods of calcination and sintering are not limited to particular methods. For example, the sintering may be carried out with an electric furnace, a gas furnace or the like.

Subsequently, the calcinated body of the outer circumferential part which is obtained by the calcination is preferably sintered to obtain the sintered body of the outer circumferential part. The sintering conditions preferably include heating in an inert atmosphere such as nitrogen or argon at 1400-1500 degrees C. for 1-20 hours.

Although the outer circumferential part is preferably prepared by bonding a plurality of honeycomb segments in the above-mentioned manner, other methods may be used. For example, a single cylindrical honeycomb formed body may be made, and the inside of this body may be ground off such that a circular column-like inner space extending between the both end faces is created. This provides an annular honeycomb formed body. When this configuration is employed, the center part is placed in the above-mentioned inner space of the annular honeycomb formed body.

(2-3) Honeycomb Structure

Now, a method of joining the sintered body of the center part to the sintered body of the outer circumferential part with a bonding material (bonding material), and heating them to obtain the honeycomb structure.

The bonding material is preferably prepared by mixing a predetermined ceramics, binder, surfactant, pore former, water and the like to obtain a mixture, and kneading this mixture. The bonding material is preferably in the form of paste. The kneading method is not limited to a particular method. For example, a vertical agitator may be used.

Subsequently, the sintered body of the center part is joined to the sintered bodies of the outer circumferential part by the bonding material, and the sintered bodies of the outer circumferential part are joined to each other by the bonding material such that a honeycomb bonded body which has a desired shape of the honeycomb structure to be manufactured is formed. Then, the honeycomb bonded body is preferably heat treated to obtain a honeycomb structure. The heating conditions preferably include heating at 500-800 degrees C. for 2-4 hours. The bonding material becomes the bonding parts upon the heating.

EXAMPLES

In the following description, the present invention will be described more concretely with reference to examples, but it should be understood that the present invention is not limited by these examples in any aspects.

Example 1

A silicon carbide (SiC) powder and a metallic silicon (Si) powder were mixed at the mass ratio of 80:20. Hydroxypropyl methyl cellulose as a binder and water-absorbable resin as a pore former were added to the SiC—Si powder mixture, and water was also added to prepare a raw material for the forming process. The raw material for forming was kneaded by a vacuum clay kneader to prepare a columnar kneaded clay. The content of the binder was 7 parts by mass when the sum of the silicon carbide (SiC) powder and metallic silicon (Si) powder was taken as 100 parts by mass. The content of the pore former was 3 parts by mass when the sum of the silicon carbide (SiC) powder and metallic silicon (Si) powder was taken as 100 parts by mass. The content of the water was 42 parts by mass when the sum of the silicon carbide (SiC) powder and metallic silicon (Si) powder was taken as 100 parts by mass. The average particle diameter of the silicon carbide powder was 20 micrometers, and the average particle diameter of the metallic silicon powder was 6 micrometers. The average particle diameter of the pore former was 20 micrometers. The average particle diameters of the silicon carbide, the metallic silicon and the pore former were values measured by laser diffractometry.

The resulting columnar kneaded clay was formed by an extruding machine to obtain a honeycomb formed body. This honeycomb formed body was heated and dried by high frequency dielectric heating, dried by a hot air drying machine at 120 degrees C. for two hours, and both end faces (both ends) were cut by appropriate amounts to obtain a dried body of the center part.

Then, a silicon carbide (SiC) powder and a metallic silicon (Si) powder were mixed at the mass ratio of 60:40. Hydroxypropyl methyl cellulose as a binder, glycerol as a moisturizing agent and surfactant as a dispersing agent were added to the SiC—Si powder mixture, and water was also added and mixed together. This mixture was kneaded to obtain a raw material for forming the electrode. The content of the binder was 0.5 parts by mass when the sum of the silicon carbide (SiC) powder and metallic silicon (Si) powder was taken as 100 parts by mass. The content of the glycerol was 10 parts by mass when the sum of the silicon carbide (SiC) powder and metallic silicon (Si) powder was taken as 100 parts by mass. The content of the surfactant was 0.3 parts by mass when the sum of the silicon carbide (SiC) powder and metallic silicon (Si) powder was taken as 100 parts by mass. The content of the water was 42 parts by mass when the sum of the silicon carbide (SiC) powder and metallic silicon (Si) powder was taken as 100 parts by mass. The average particle diameter of the silicon carbide powder was 52 micrometers, and the average particle diameter of the metallic silicon powder was 6 micrometers. The average particle diameters of the silicon carbide and the metallic silicon were values measured by laser diffractometry. The kneading was carried out with a vertical agitator.

Next, the electrode forming raw material was applied on the side face of the dried honeycomb formed body (dried body of the center part) in a band shape extending from one end face to the other end face of the honeycomb formed body such that the electrode forming raw material had a "thickness of 1.5 mm and a half central angle being 40 degrees". The central angle is a "central angle in the cross section, taken in a direction perpendicular to the extending direction of the cells, with the angle center being the center of the honeycomb formed body". The electrode forming raw material was applied at two positions on the side face of the dried honeycomb formed body. When viewed in the cross section perpendicular to the extending direction of the cells, the electrode forming raw material applied at one of the two positions was situated opposite the electrode forming raw material applied at the other position over the center of the honeycomb formed body.

Then, the electrode forming raw material applied on the honeycomb formed body was dried. The drying condition was 70 degrees C.

A silicon carbide (SiC) powder and a metallic silicon (Si) powder were mixed at the mass ratio of 60:40. Hydroxypropyl methyl cellulose as a binder was added to the SiC—Si mixture, and water was also added and mixed to prepare another mixture. The resulting mixture was kneaded to prepare a raw material for the electrode terminal. The electrode terminal-forming raw material was processed by a vacuum clay kneader to prepare a kneaded clay. The content of the binder was 4 parts by mass when the sum of the silicon carbide (Sic) powder and metallic silicon (Si) powder was taken as 100 parts by mass. The content of the water was 22 parts by mass when the sum of the silicon carbide (SiC) powder and metallic silicon (Si) powder was taken as 100 parts by mass. The average particle diameter of the silicon carbide powder was 52 micrometers, and the average particle diameter of the metallic silicon powder was 6 micrometers. The average particle diameters of the silicon carbide and the metallic silicon were values measured by laser diffractometry.

The obtained kneaded clay was formed by the vacuum clay kneader to obtain a cylindrical shape, and dried to obtain the member for forming the electrode terminal. The drying condition was 70 degrees C. The member for forming the electrode terminal had a column shape with its bottom being 7 mm in the diameter and its length being 10 mm in the center axis direction. Two members for forming the electrode terminal were prepared.

The two members for forming the electrode terminal were attached to those two positions on the honeycomb formed body on which the electrode forming raw material was applied respectively. The electrode forming raw material was used to attach the electrode terminal-forming members to those portions of the honeycomb formed body on which the electrode forming raw material was applied. Then, the "honeycomb formed body, onto which the electrode forming raw material was applied and the electrode terminal-forming members were attached", underwent degreasing to obtain the before-sintering center part. The degreasing condition was 550 degrees C. for three hours.

Then, the before-sintering center part was sintered to obtain the sintered body of the center part. The sintering condition was 1450 degrees C. for two hours.

Subsequently, the outer circumferential part was prepared. In order to prepare the outer circumferential part, firstly, talc, kaolin, alumina, aluminum hydroxide and silica were mixed to prepare a cordierite-forming raw material. 13 parts by mass of the pore former, 35 parts by mass of the dispersion medium, 6 parts by mass of the organic binder and 0.5 parts by mass of the dispersing agent were added to 100 parts by mass of the cordierite-forming raw material, and they were mixed and kneaded to prepare a kneaded clay. Coke having an average particle diameter of 1-10 micrometers was used as a pore former. Water was used as a dispersion medium. Hydroxypropyl methylcellulose was used as an organic binder. ethylene glycol was used as a dispersing agent.

A predetermined die was used to extrude the kneaded clay, and obtained was a honeycomb formed body which had a shape like the honeycomb segment 36a of the outer circumferential part 36 of the honeycomb structure 100 shown in FIGS. 1-3. The obtained overall shape of the honeycomb formed body was a "shape that was obtained by removing a "concentric and smaller-in-radius sector form" from a sector form leaving the outer peripheral portion of the sector form, when viewed in the cross section taken in the direction perpendicular to the extending direction of the cells. Eight such honeycomb formed bodies were prepared. Concaves (portions which will become the concaves 36c) were made in the side edges of the two of these honeycomb formed bodies so that the opening 38 for the electrode terminal is finally formed (see FIG. 1). The obtained honeycomb formed bodies were dried by the microwave drying machine, and further dried out completely by the hot air drying machine. Then, the both end faces of each honeycomb formed body were cut off to have a desired dimension. In this manner, the before-sintering honeycomb segments (dried bodies of the outer circumferential part) were obtained.

Next, the dried bodies of the outer circumferential part were sintered to obtain sintered bodies of the outer circumferential part. The sintering condition was 1450 degrees C. for six hours.

Next, the bonding material was prepared. The bonding material was prepared by mixing main components with subcomponents, and kneading them. The composition of the main components was 41 mass % of SiC fine particle, 16.5 mass % of SiC coarse particle, 22 mass % of mica, 20 mass % of colloidal silica and 0.5 mass % of bentonite. The subcomponents were 1.5 parts by mass of the organic pore former, 0.4 parts by mass of the organic binder and 0.04 parts by mass of the dispersing agent when the entire main components were taken as 100 parts by mass. Water was also mixed as the subcomponent. The resulting mixture was kneaded by a mixer for 30 minutes to obtain a paste-like bonding material. The added amount of water was adjusted such that the paste viscosity became 20-60 Pa's. The viscosity was a value measured by an analog viscometer manufactured by RION Co., Ltd. of Japan (Type: VT-04F) at 25 degrees C. No. 2 rotor was used at 62.5 rpm.

Next, the sintered body of the center part and the eight sintered bodies of the outer circumferential part were joined and bonded by the bonding material so that the configuration of the honeycomb structure 100 shown in FIG. 1-3 was obtained. The bonded structure of the sintered body of the center part and the eight sintered bodies of the outer circumferential part bonded by the bonding material (bonded body) was dried by the hot air drying machine at 140 degrees C. for two hours. The bonded body was thermally treated by an electric furnace at 700 degrees C. for two hours to obtain the honeycomb structure. The bonding material became the bonding parts upon the drying and thermal treatment.

In the resulting honeycomb structure, the material density of the center part was 1.71 g/cm$^3$. The specific heat of the center part was 680 J/kg·K. The material heat capacity of the center part was 1163 J/m$^3$·K. The opening percentage of the cells in the center part was 780. The volumetric heat capacity of the center part was 256 J/m$^3$·K. The thickness of the partition wall of the center part was 140 micrometers. The shape of the center part was cylindrical with its bottom diameter being 46.5 mm and its height being 100 mm.

In the resulting honeycomb structure, the material density of the outer circumferential part was 0.88 g/cm$^3$. The specific heat of the outer circumferential part was 770 J/kg·K. The material heat capacity of the outer circumferential part was 674 J/m$^3$·K. The opening percentage of the cells in the outer circumferential part was 83%. The volumetric heat capacity of the outer circumferential part was 115 J/m$^3$·K. The thickness of the partition wall of the outer circumferential part was 100 micrometers. The shape of the outer circumferential part was annular (see the outer circumferential part 36 of the honeycomb structure 100 shown in FIGS. 1-3), when viewed in the cross section taken in the direction perpendicular to the extending direction of the cells.

In the resulting honeycomb structure, the thickness of the bonding part was 1.0 mm.

The shape of the resulting honeycomb structure was cylindrical with its bottom diameter being 65 mm and its height being 100 mm. The electric resistivity of the honeycomb structure part of the center part was 35 Ωcm. The thickness of each of the two electrodes was 1.5 mm, respectively. A half of the central angle of each of the two electrodes was 40 degrees, when viewed in the cross section taken in the direction perpendicular to the extending direction of the cells. The heat capacity ratio of the obtained honeycomb structure (i.e., 100× volumetric heat capacity of the outer circumferential part/ volumetric heat capacity of the center part) was 45%.

(Method of Measuring Material Density)

The material density was a value measured by a mercury porosimeter.

(Method of Measuring Specific Heat)

The specific heat was a value measured by DSC (Differential Scanning Calorimetry) method.

(Method of Measuring Material Heat Capacity)

The material heat capacity was a value derived from a heat capacity calculation approach, based on a volume, which was calculated using an average thickness of the partition wall of the measurement target (center part or outer circumferential part) measured with an optical microscope, while the porosity, the material's specific gravity and specific heat were taken into account. The thickness of the partition wall was a value of the average thickness that was obtained from eight positions in the circumferential direction of the partition wall measured with the optical microscope. The porosity of the partition wall was a value measured by a mercury porosimeter (AutoPore IV9505, manufactured by Micromeritics Instrument Corporation).

(Method of Measuring Electric Resistivity)

The electric resistivity of the honeycomb structure part constituting the center part was measured by the following method: A test piece was prepared with the same material as the measurement target. The test piece size was 10 mm×10 mm×50 mm. (Specifically, when the electric resistivity of the honeycomb structure part should be measured, for example, the test piece was made from the same material as the honeycomb structure part.) Silver paste was applied onto the entire end faces of the test piece and electric wiring was connected for electricity feeding. A voltage application and current measuring device was coupled to the test piece, and a voltage was applied. A thermocouple was installed on the center area of the test piece, and the chronological temperature variations of the test piece upon the voltage application were observed by a recorder. A voltage of 100-200 V was applied, and the current and voltage values were measured when the test piece temperature was 400 degrees C. The electric resistivity was calculated based on the obtained current and voltage values as well as the test piece dimensions.

(Method of Measuring Temperature Difference (ΔT))

A testing machine equipped with a propane gas burner was used to carry out a heating/cooling test on the honeycomb structure. This testing machine "used a gas burner to combust a propane gas and was able to feed a heated gas" into a metallic casing that housed the honeycomb structure. When the cooling/heating test was carried out, the "temperature difference" in the honeycomb structure were measured. At first, specifically, the prepared honeycomb structure was housed (canned) in the metallic casing of the testing machine equipped with the propane gas burner. Then, a gas heated by the gas burner was introduced into the metallic casing such that the heated gas flowed through the honeycomb structure. The temperature conditions of the heated gas to be introduced into the metallic casing (inlet gas temperature conditions) were as follows: Firstly, the gas was heated to 950 degrees C. in five minutes, maintained at 950 degrees C. for ten minutes, cooled to 100 degrees C. in five minutes, and maintained at 100 degrees C. for ten minutes (heating and cooling test). When the honeycomb structure was heated and cooled, the surface temperature of the outer circumferential wall of the honeycomb structure was continuously measured, and the inner temperature of the honeycomb structure, which was the temperature at 5 mm inside from the outer circumferential wall surface, was also continuously measured. When the temperature difference between the surface temperature of the outer circumferential wall and the 5 mm inside temperature from the outer circumferential wall surface reached the maximum value, this temperature difference (maximum temperature difference) was calculated. This maximum temperature difference was shown as "Temperature Difference" in Table 1. The temperature of the honeycomb structure was measured with a thermocouple.

(Thermal Shock Resistance Test)

A testing machine equipped with a propane gas burner was used to carry out a heating/cooling test (100 cycles) on the honeycomb structure. This testing machine "used a gas burner to combust a propane gas and was able to feed a heated gas" into a metallic casing that housed the honeycomb structure. At first, specifically, the prepared honeycomb structure was housed (canned) in the metallic casing of the testing machine equipped with the propane gas burner. Then, a gas heated by the gas burner was introduced into the metallic casing such that the heated gas flowed through the honeycomb structure. The temperature conditions of the heated gas to be introduced into the metallic casing (inlet gas temperature conditions) were as follows: Firstly, the gas was heated to 950 degrees C. from 100 degrees C. in five minutes, maintained at 950 degrees C. for ten minutes, cooled to 100 degrees C. in five minutes, and maintained at 100 degrees C. for ten minutes. Subsequently, the heating-and-cooling cycle of the gas being "heated to 950 degrees C. from 100 degrees C. in five minutes, maintained at 950 degrees C. for ten minutes, cooled to 100 degrees C. in five minutes, and maintained at 100 degrees C. for ten minutes" was repeated for 100 cycles. Then, the gas was cooled to the room temperature, and any occurrence of the cracking in the honeycomb structure was observed. The results of the thermal shock resistance test were shown in the "Cracking" column in Table 1. "None" in the "Cracking" column indicates that there was no cracking, and "Observed" indicates that there was cracking. "None" indicates that the honeycomb structure passed the test.

TABLE 1

| | Center Part | | | | | | Outer Circumferential Part | | |
| --- | --- | --- | --- | --- | --- | --- | --- | --- | --- |
| | Material Density g/cm³ | Specific Heat J/kg·K | Material's Heat Capacity J/m³·K | Thermal Expansion Coefficient 10⁻⁶/K | Opening Percentage % | Volumetric Heat Capacity J/m³·K | Material Density g/cm³ | Specific Heat J/kg·K | Material's Heat Capacity J/m³·K |
| Example 1 | 1.71 | 680 | 1163 | 2.0 | 78 | 256 | 0.88 | 770 | 674 |
| Example 2 | 1.71 | 680 | 1163 | 2.0 | 78 | 256 | 1.20 | 770 | 924 |
| Example 3 | 1.71 | 680 | 1163 | 2.0 | 78 | 256 | 1.30 | 770 | 1001 |
| Comparative Example 1 | 1.71 | 680 | 1163 | 2.0 | 78 | 256 | 1.99 | 770 | 1532 |
| Example 4 | 1.71 | 680 | 1163 | 2.0 | 78 | 256 | 1.20 | 770 | 924 |
| Example 5 | 1.71 | 680 | 1163 | 2.0 | 78 | 256 | 1.20 | 770 | 924 |
| Example 6 | 1.71 | 680 | 1163 | 2.0 | 78 | 256 | 1.20 | 770 | 924 |
| Comparative Example 2 | 1.71 | 680 | 1163 | 2.0 | 78 | 256 | 1.20 | 770 | 924 |

| | Outer Circumferential Part | | | Heat Capacity Ratio (Outer Circumferential Part/Center Part) % | Temperature Difference (ΔT) °C. | Cracking |
| --- | --- | --- | --- | --- | --- | --- |
| | Thermal Expansion Coefficient 10⁻⁶/K | Opening Percentage % | Volumetric Heat Capacity J/m³·K | | | |
| Example 1 | 4.3 | 83 | 115 | 45 | 130 | None |
| Example 2 | 4.3 | 83 | 157 | 61 | 140 | None |
| Example 3 | 4.3 | 83 | 170 | 67 | 145 | None |
| Comparative Example 1 | 4.3 | 83 | 260 | 102 | 200 | Observed |
| Example 4 | 4.3 | 83 | 157 | 61 | 140 | None |

TABLE 1-continued

| | | | | | | |
|---|---|---|---|---|---|---|
| Example 5 | 4.3 | 79 | 194 | 76 | 150 | None |
| Example 6 | 4.3 | 76 | 222 | 87 | 160 | None |
| Comparative Example 2 | 4.3 | 69 | 286 | 112 | 220 | Observed |

Examples 2-6 and Comparative Examples 1 and 2

The honeycomb structure was manufactured in the same manner as in Example 1, except for the conditions on the outer circumferential part of the honeycomb structure being altered as shown in Table 1. In the same manner as in Example 1, the above-described method was used to measure the "temperature difference $\Delta T$", and the "thermal shock resistance test" was carried out. The results are shown in Table 1.

It is understood from Table 1 that it is possible to prevent the occurrence of the cracking in the thermal shock resistance test, when the volumetric heat capacity of the outer circumferential part is smaller than the volumetric heat capacity of the center part. It is also understood that the thermal shock resistance decreases when the opening percentage of the cells of the outer circumferential part becomes less than 70%.

INDUSTRIAL APPLICABILITY

The honeycomb structure of the present invention can preferably be used as the catalyst carrier for the exhaust gas purification device adapted to purify the exhaust gas of an automobile.

DESCRIPTION OF REFERENCE NUMERALS

1: Partition wall, 2: Cell, 3: Outer circumferential wall, 4: Honeycomb structure part, 5: Side face, 6: Center part, 11: One end face, 12: The other end face, 21: Electrode, 22: Electrode terminal, 31: Partition wall (partition wall of the outer circumferential part), 32: Cell (cell of the outer circumferential part), 33: Outer circumferential wall (outer circumferential wall of the outer circumferential part), 36: Outer circumferential part, 36a: Honeycomb segment, 36b: Side edge, 36c: Concave, 37: Bonding parts, 38: Opening for the electrode terminal, 100: Honeycomb structure, O: Center, Alpha ($\alpha$): Central angle, Beta ($\beta$): Angle, Theta ($\theta$): Half angle of the central angle

The invention claimed is:

1. A honeycomb structure comprising:
a center part including a cylindrical honeycomb structure part and a pair of electrodes provided on a side face of the cylindrical honeycomb structure part, the cylindrical honeycomb structure part having a porous partition wall and an outer circumferential wall around the porous partition wall, the porous partition wall defining a plurality of cells extending from one end face to the other end face, the plurality of cells defining fluid passages; and
an outer circumferential part provided around the center part,
wherein an electric resistivity of the cylindrical honeycomb structure part is 1-200 $\Omega$cm,
each electrode in the pair of electrodes is formed in a band shape that extends in an extending direction of the plurality of cells of the cylindrical honeycomb structure part,
one electrode in the pair of electrodes is located opposite an other electrode in the pair of electrodes over a center of the cylindrical honeycomb structure part, when viewed in a cross section taken in a direction perpendicular to the extending direction of the plurality of cells,
the outer circumferential part has a porous partition wall and an outer circumferential wall at an outer most circumferential position, the porous partition wall defining a plurality of cells extending from one end face to the other end face, the plurality of cells defining fluid passages, and
a volumetric heat capacity of the outer circumferential part is smaller than a volumetric heat capacity of the center part.

2. The honeycomb structure according to claim 1,
wherein the volumetric heat capacity of the outer circumferential part is 40-90% of the volumetric heat capacity of the center part.

3. The honeycomb structure according to claim 1,
wherein an area of the outer circumferential part, when viewed in a cross section taken in a direction perpendicular to the extending direction of the cells, is 20-50% of an entire area.

4. The honeycomb structure according to claim 2,
wherein an area of the outer circumferential part, when viewed in a cross section taken in a direction perpendicular to the extending direction of the cells, is 20-50% of an entire area.

5. The honeycomb structure according to claim 1,
wherein a thermal expansion coefficient of the outer circumferential part is $0.1 \times 10^{-6}$/K to $3.0 \times 10^{-6}$/K, and a thermal expansion coefficient of the center part is $3.5 \times 10^{-6}$/K to $5.5 \times 10^{-6}$/K.

6. The honeycomb structure according to claim 2,
wherein a thermal expansion coefficient of the outer circumferential part is $0.1 \times 10^{-6}$/K to $3.0 \times 10^{-6}$/K, and a thermal expansion coefficient of the center part is $3.5 \times 10^{-6}$/K to $5.5 \times 10^{-6}$/K.

7. The honeycomb structure according to claim 3,
wherein a thermal expansion coefficient of the outer circumferential part is $0.1 \times 10^{-6}$/K to $3.0 \times 10^{-6}$/K, and a thermal expansion coefficient of the center part is $3.5 \times 10^{-6}$/K to $5.5 \times 10^{-6}$/K.

8. The honeycomb structure according to claim 4,
wherein a thermal expansion coefficient of the outer circumferential part is $0.1 \times 10^{-6}$/K to $3.0 \times 10^{-6}$/K, and a thermal expansion coefficient of the center part is $3.5 \times 10^{-6}$/K to $5.5 \times 10^{-6}$/K.

9. The honeycomb structure according to claim 1,
wherein an opening percentage of the cells of the outer circumferential part is greater than an opening percentage of the cells of the center part.

10. The honeycomb structure according to claim 2,
wherein an opening percentage of the cells of the outer circumferential part is greater than an opening percentage of the cells of the center part.

11. The honeycomb structure according to claim 3,
wherein an opening percentage of the cells of the outer circumferential part is greater than an opening percentage of the cells of the center part.

12. The honeycomb structure according to claim 4, wherein an opening percentage of the cells of the outer circumferential part is greater than an opening percentage of the cells of the center part.

13. The honeycomb structure according to claim 5, wherein an opening percentage of the cells of the outer circumferential part is greater than an opening percentage of the cells of the center part.

14. The honeycomb structure according to claim 6, wherein an opening percentage of the cells of the outer circumferential part is greater than an opening percentage of the cells of the center part.

15. The honeycomb structure according to claim 7, wherein an opening percentage of the cells of the outer circumferential part is greater than an opening percentage of the cells of the center part.

16. The honeycomb structure according to claim 8, wherein an opening percentage of the cells of the outer circumferential part is greater than an opening percentage of the cells of the center part.

* * * * *